United States Patent [19]
Seefeldt et al.

[11] Patent Number: 6,021,675
[45] Date of Patent: Feb. 8, 2000

[54] RESONATING STRUCTURE AND METHOD FOR FORMING THE RESONATING STRUCTURE

[75] Inventors: James D. Seefeldt, DeForest; Michael F. Mattes, Janesville, both of Wis.

[73] Assignee: SSI Technologies, Inc., Janesville, Wis.

[21] Appl. No.: 08/807,968

[22] Filed: Feb. 28, 1997

Related U.S. Application Data

[63] Continuation-in-part of application No. 08/488,146, Jun. 7, 1995, and application No. 08/480,267, Jun. 7, 1995.
[60] Provisional application No. 60/023,819, Aug. 12, 1996.
[51] Int. Cl.$^7$ ...................................................... G01B 7/16
[52] U.S. Cl. ............................ 73/777; 73/862.68; 73/721
[58] Field of Search .............................. 73/777, 862.381, 73/862.68, 718, 721, 727

[56] References Cited

U.S. PATENT DOCUMENTS

| | | | |
|---|---|---|---|
| 3,909,924 | 10/1975 | Vindasius et al. | 29/574 |
| 3,994,009 | 11/1976 | Hartlaub | 257/419 |
| 4,035,823 | 7/1977 | Marshall | 257/419 |
| 4,258,565 | 3/1981 | Sawayama et al. | 73/141 R |
| 4,532,700 | 8/1985 | Kinney et al. | 29/576 W |
| 4,567,451 | 1/1986 | Greenwood | 331/155 |
| 4,628,591 | 12/1986 | Zorinsky et al. | 29/576 W |
| 4,628,740 | 12/1986 | Ueda et al. | 73/705 |

(List continued on next page.)

FOREIGN PATENT DOCUMENTS

| | | |
|---|---|---|
| 1-13773 | 1/1989 | Japan . |
| 1-50532(A)0 | 2/1989 | Japan . |
| 1-136378 | 5/1989 | Japan . |
| 4-291953 | 10/1992 | Japan . |
| 5-082806 | 4/1993 | Japan . |
| 5-090615 | 4/1993 | Japan . |

OTHER PUBLICATIONS

H. Guckel et al., "Planar Processed, Integrated Displacement Sensors", Micromachining and Micropackaging of Transducers, Elsevier Science Publishers B.V., Amsterdam, 1985, pp. 199–203.

H. Guckel et al., "A Technology for Integrated Transducers", Wisconsin Center for Applied Microelectronics, 1985, pp. 90–92.

Ikeda et al., "Silicon Pressure Sensor with Resonant Strain Gages Built into Diaphragm", Technical Digest of the 7th Sensor Symposium, 1988, pp. 55–58.

Ikeda et al., "Three Dimensional Micromachining of Silicon Resonant Strain Gage", Technical Digest of the 7th Sensor Symposium, 1988, pp. 193–196.

Lee, "The Fabrication of Thin, Freestanding, Single–Crystal, Semiconductor Membranes", J. Electrochem. Soc., vol. 137, No. 8, 1990, 2556–2574.

H. Guckel, "Surface micromachined pressure transducers", Sensors and Actuators A, 20, 1991, pp. 133–146.

Yoshida et al., "Photo–Induced Preferential Anodization for Fabrication of Monocrystalline Micromechanical Structures", Micro Electro Mechanical Systems, 1992, pp. 56–61.

Anderson et al., "Porous Polycrystalline Silicon: A New Material for MEMS", Journal of Microeletromechanical Systems, vol. 3, No. 1, 1994, pp. 10–18.

*Primary Examiner*—Max Noori
*Attorney, Agent, or Firm*—Michael Best & Friedrich LLP

[57] ABSTRACT

A force transducer having a semiconductor substrate including a surface defining a recess, such that the recess has a peripheral boundary and a flexible diaphragm connected to the surface along the peripheral boundary to enclose the recess so that the diaphragm moves in response to changes in a force applied thereto. The force transducer also includes a resonant beam connected to the surface adjacent the peripheral boundary. The resonant beam has a frequency of resonation. Movement of the diaphragm in response to changes in the force applied to the diaphragm changes the frequency of resonation of the resonant beam.

25 Claims, 20 Drawing Sheets

U.S. PATENT DOCUMENTS

| | | | |
|---|---|---|---|
| 4,665,610 | 5/1987 | Barth | 29/580 |
| 4,744,863 | 5/1988 | Guckel et al. | 156/653 |
| 4,766,666 | 8/1988 | Sugiyama et al. | 29/610 SG |
| 4,771,638 | 9/1988 | Sugiyama et al. | 73/721 |
| 4,771,639 | 9/1988 | Saigusa et al. | 73/727 |
| 4,772,786 | 9/1988 | Langdon | 250/231 R |
| 4,784,721 | 11/1988 | Holmen et al. | 156/647 |
| 4,800,759 | 1/1989 | Hirata et al. | 73/708 |
| 4,805,456 | 2/1989 | Howe et al. | 73/517 AV |
| 4,831,304 | 5/1989 | Dorey et al. | 310/311 |
| 4,841,272 | 6/1989 | Yamagishi et al. | 338/2 |
| 4,841,775 | 6/1989 | Ikeda et al. | 73/704 |
| 4,853,669 | 8/1989 | Guckel et al. | 338/4 |
| 4,889,590 | 12/1989 | Tucker et al. | 156/647 |
| 4,893,509 | 1/1990 | MacIver et al. | 73/517 AV |
| 4,897,360 | 1/1990 | Guckel et al. | 437/7 |
| 4,901,570 | 2/1990 | Chang et al. | 73/517 AV |
| 4,926,143 | 5/1990 | Harada et al. | 331/156 |
| 4,945,769 | 8/1990 | Sidner et al. | 73/727 |
| 4,956,795 | 9/1990 | Yamaguchi et al. | 364/571.03 |
| 4,966,649 | 10/1990 | Harada et al. | 156/647 |
| 4,975,390 | 12/1990 | Fujii et al. | 437/228 |
| 4,993,143 | 2/1991 | Sidner et al. | 29/621.1 |
| 5,000,817 | 3/1991 | Aine | 156/633 |
| 5,009,108 | 4/1991 | Harada et al. | 73/704 |
| 5,090,254 | 2/1992 | Guckel et al. | 73/862.59 |
| 5,095,401 | 3/1992 | Zavracky et al. | 361/283 |
| 5,110,373 | 5/1992 | Mauger | 148/33.2 |
| 5,188,983 | 2/1993 | Guckel et al. | 437/209 |
| 5,242,863 | 9/1993 | Xiang-Zheng et al. | 437/228 |
| 5,275,055 | 1/1994 | Zook et al. | 73/778 |
| 5,295,395 | 3/1994 | Hocker et al. | 73/721 |
| 5,313,836 | 5/1994 | Fujii et al. | 73/517 R |
| 5,332,469 | 7/1994 | Mastrangelo | 156/643 |
| 5,352,635 | 10/1994 | Tu et al. | 437/228 |
| 5,357,807 | 10/1994 | Guckel et al. | 73/721 |
| 5,380,373 | 1/1995 | Kimura et al. | 148/33.2 |
| 5,405,786 | 4/1995 | Kurtz | 437/15 |
| 5,427,975 | 6/1995 | Sparks et al. | 437/79 |
| 5,442,963 | 8/1995 | Largeau | 73/766 |
| 5,473,944 | 12/1995 | Kurtz et al. | 73/704 |
| 5,500,078 | 3/1996 | Lee | 156/628.1 |

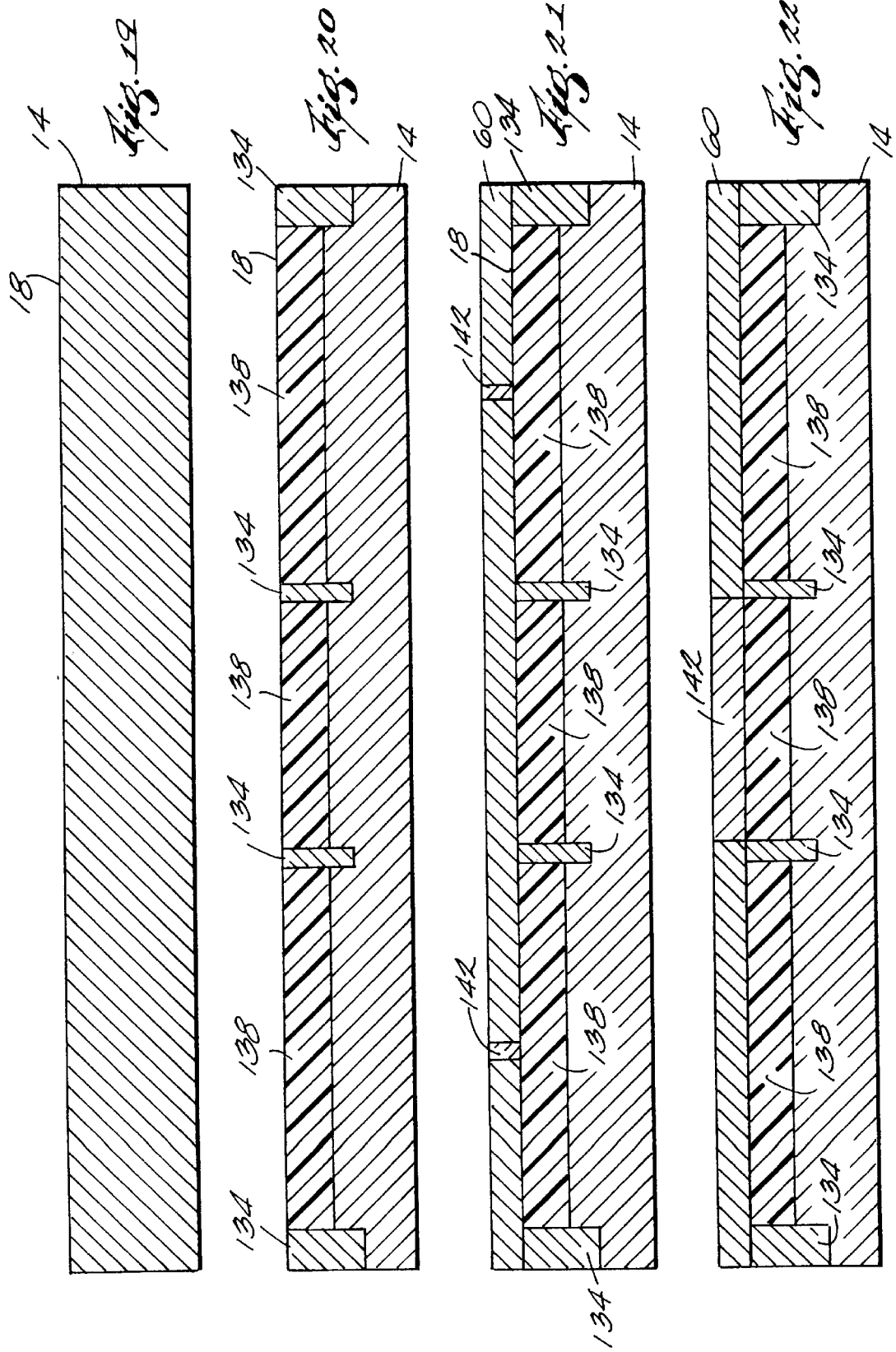

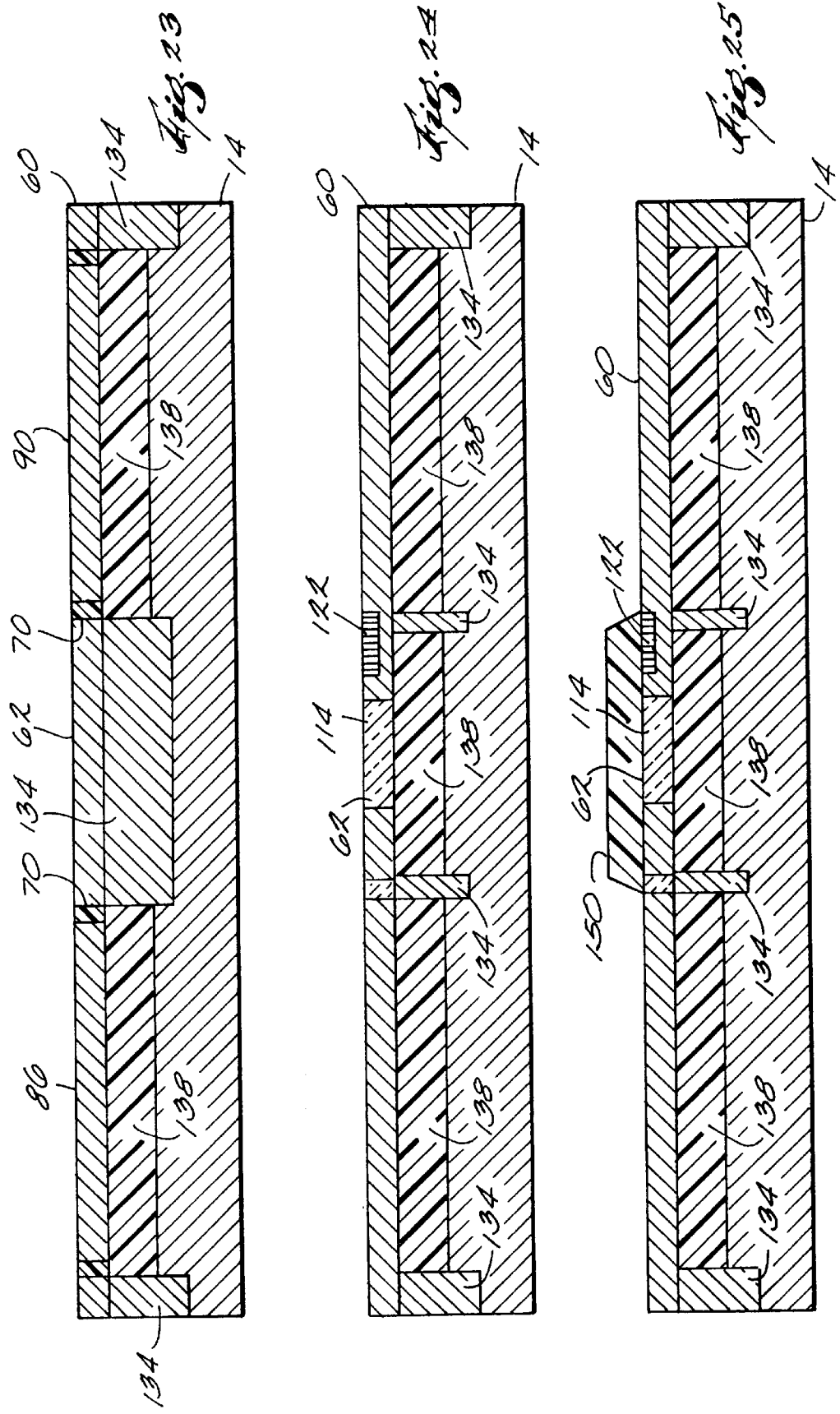

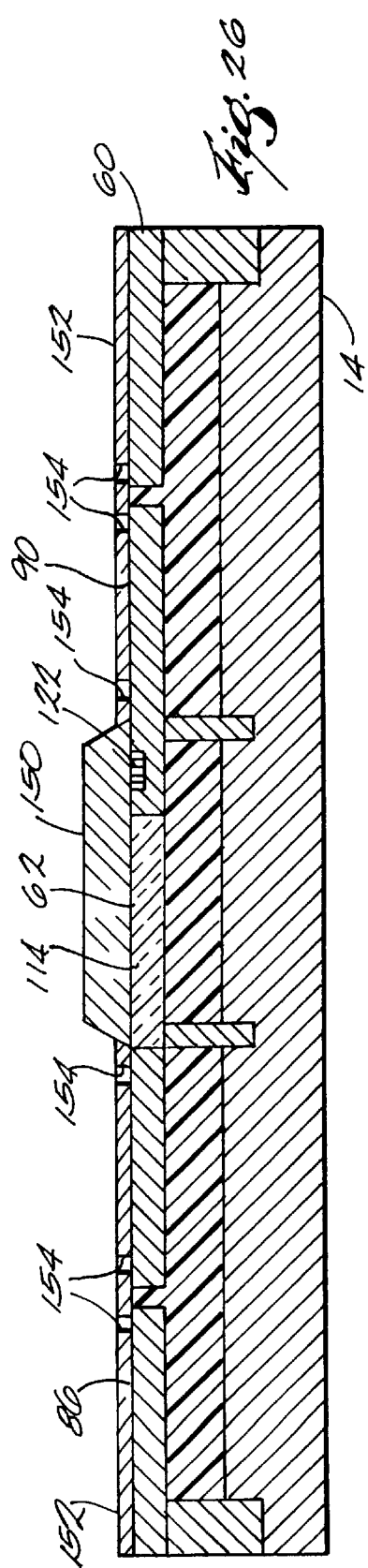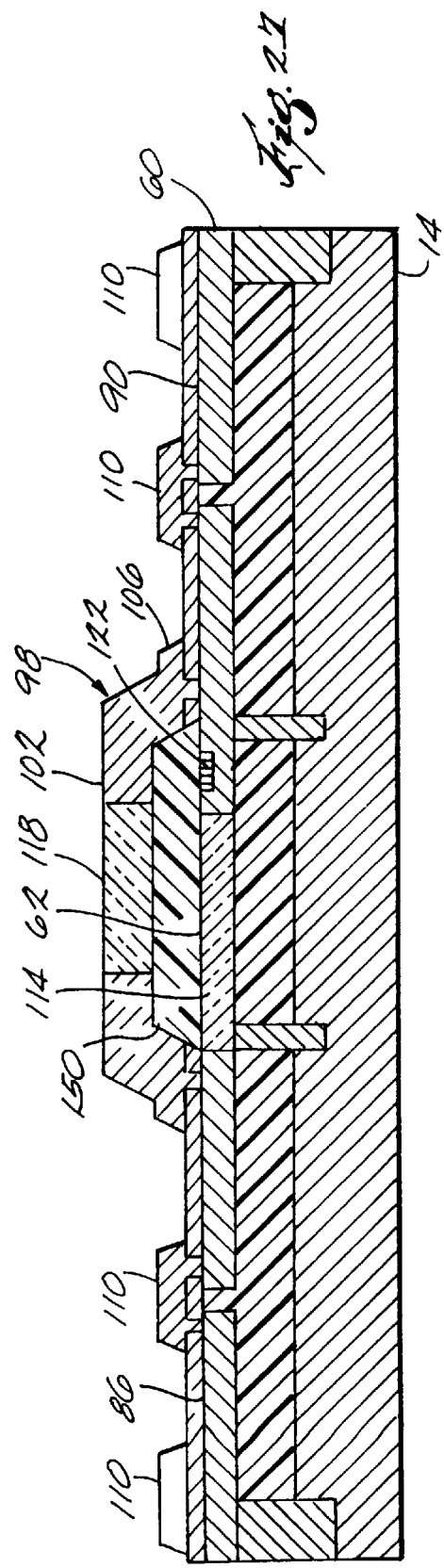

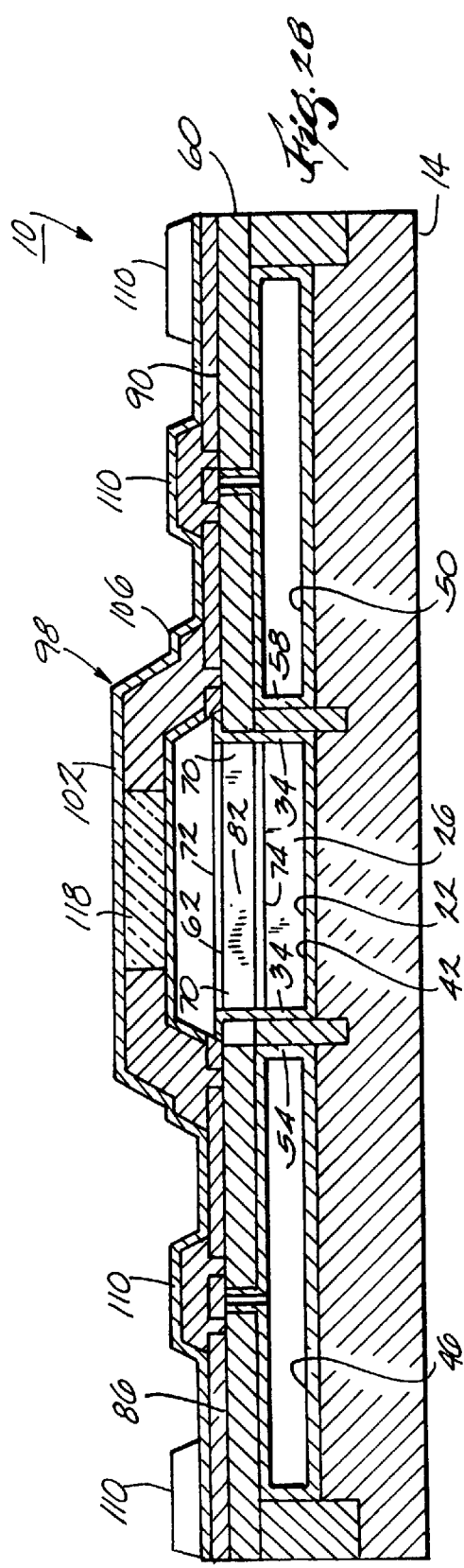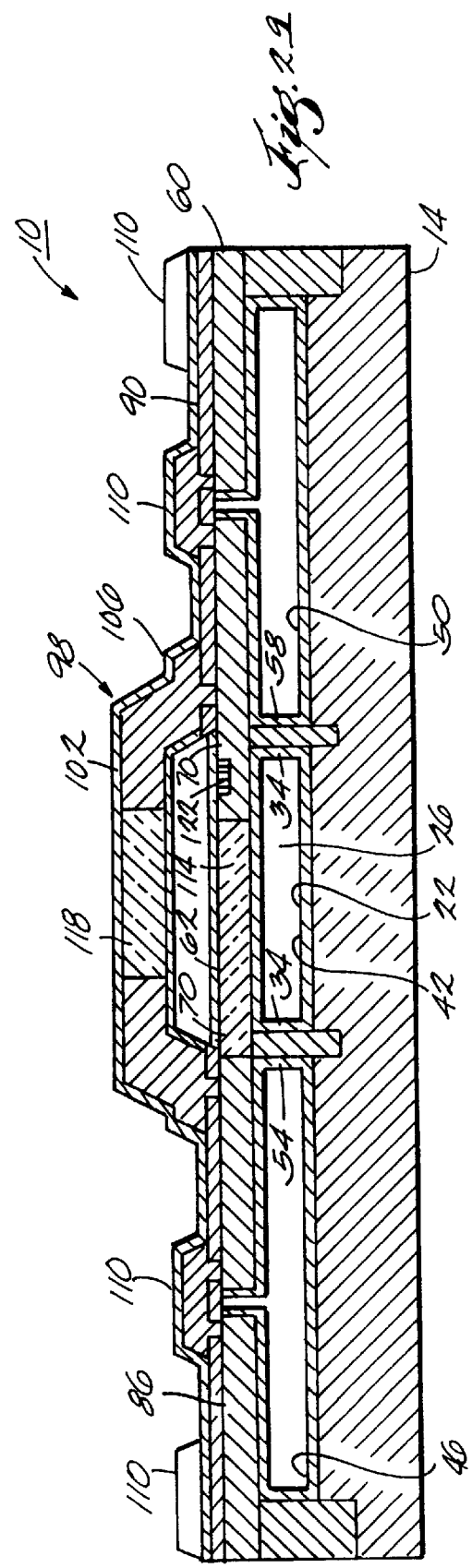

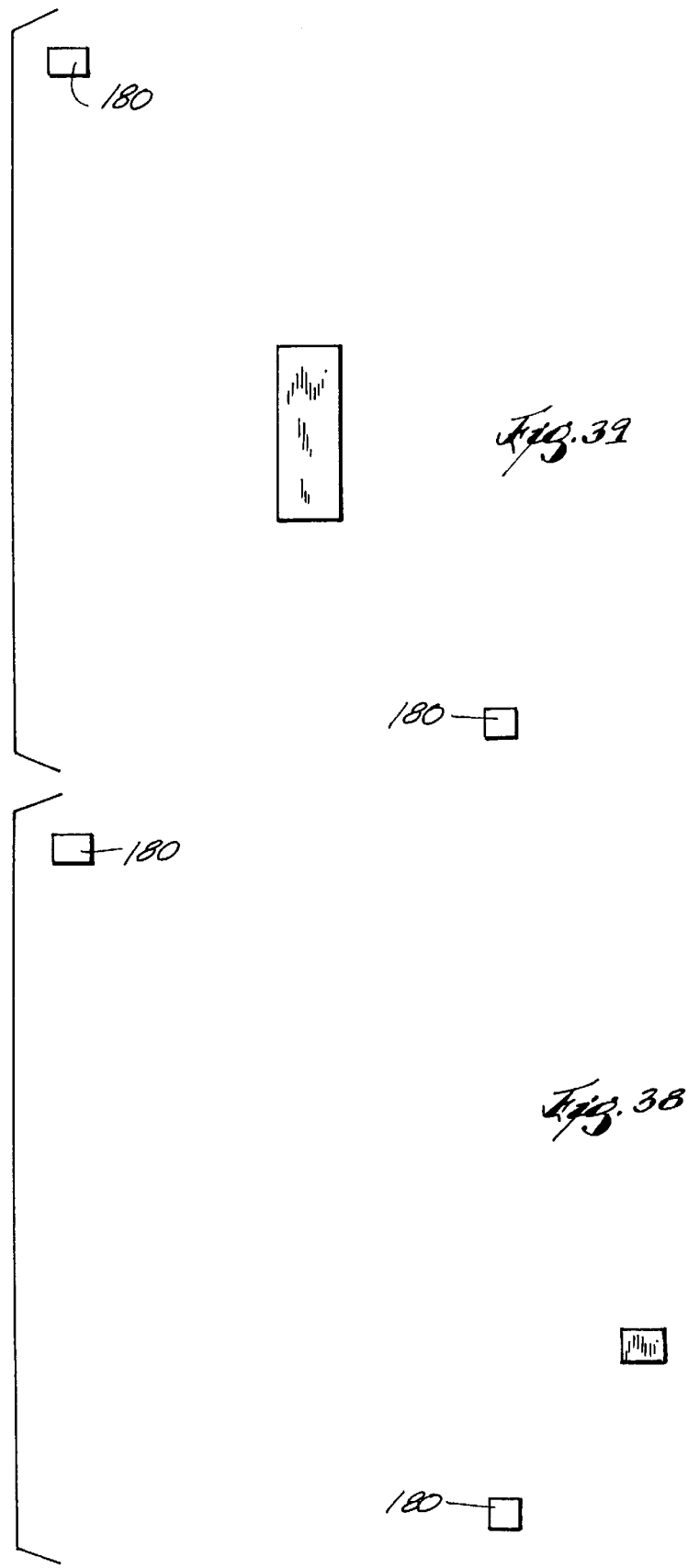

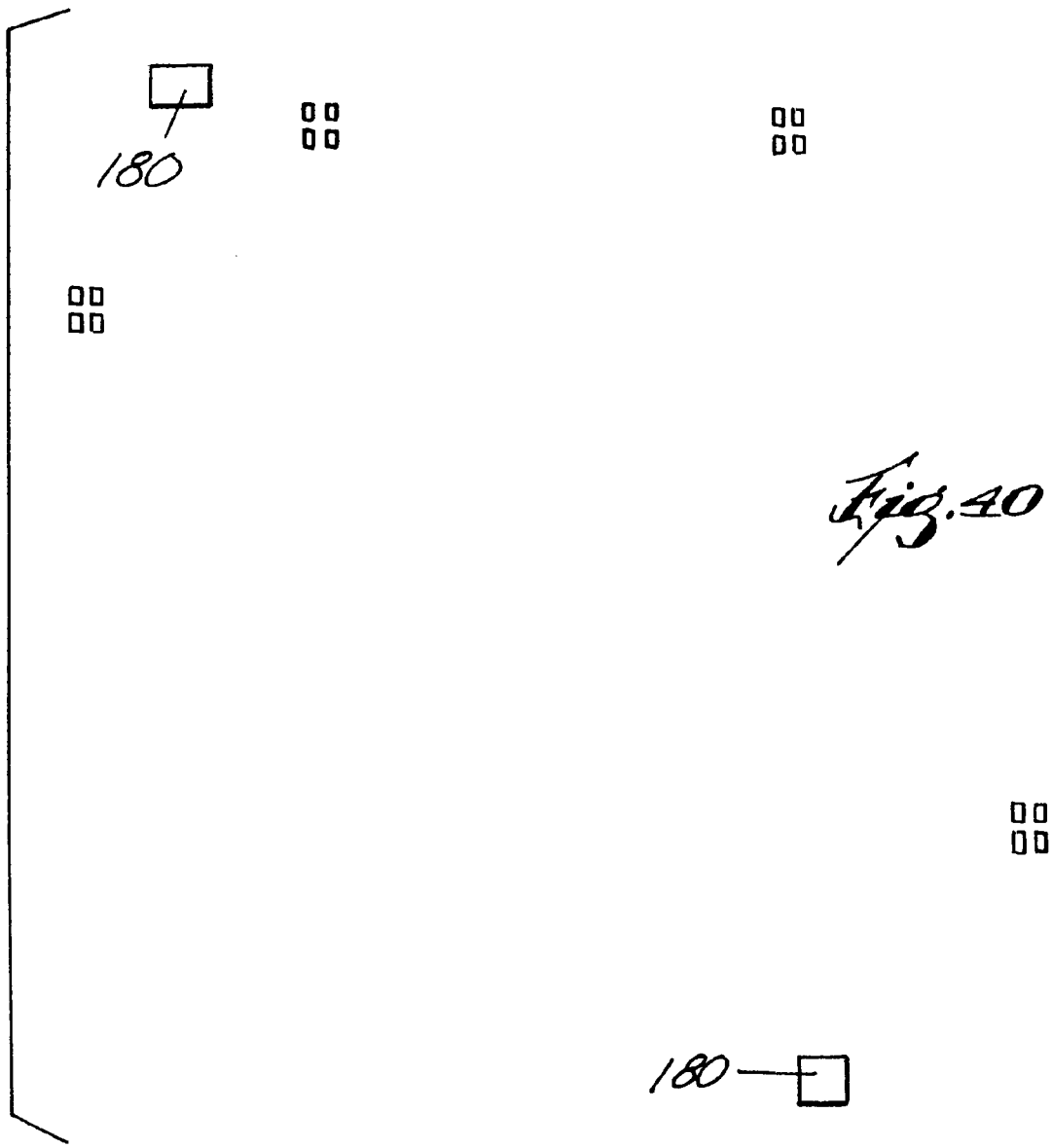

RESONATING STRUCTURE AND METHOD FOR FORMING THE RESONATING STRUCTURE

RELATED APPLICATIONS

This application is a continuation-in-part of co-pending U.S. patent application Ser. Nos. 08/488,146, filed Jun. 7, 1995, and 08/480,267, filed Jun. 7, 1995, and claims the benefit under 35 U.S.C. §119 of co-pending United States Provisional Patent Application Ser. No. 60/023,819, filed Aug. 12, 1996.

BACKGROUND OF THE INVENTION

The invention relates to transducers for measuring force, and particularly to a silicon microelectronic mechanical structure for measuring force. The invention also relates to a method of forming the microelectronic mechanical force transducer.

Semiconductor pressure transducers utilizing a diaphragm formed of semiconductor material are commonly known in the art. Examples of a few of such pressure transducers are shown and described in U.S. Pat. Nos. 4,744,863; 4,853,669; and 4,996,082.

It is also known in the art to use semiconductor material to produce a resonating beam. The beam is excited, usually using electronic means, and the vibratory motion of the beam is detected using electronic means. The signal generated by the electronic means is indicative of the frequency at which the resonating beam is vibrating and thus the physical condition of the beam.

SUMMARY OF THE INVENTION

Commonly known semiconductor force transducers, and particularly pressure transducers, typically exhibit a low sensitivity to force. As a result, existing semiconductor force transducers are of limited use in measuring very low forces or very small force changes.

Also, known semiconductor force transducers and resonating beams are typically formed from a polysilicon material which makes connection of the electronics to the microelectronic mechanical structure difficult and expensive.

Accordingly, the invention provides a force transducer including a semiconductor substrate having a surface defining a recess, such that the recess has a peripheral boundary. The force transducer also includes a flexible diaphragm connected to the surface along the peripheral boundary to enclose the recess so that the diaphragm moves in response to changes in a force applied thereto. The force transducer also includes a resonant beam connected to the surface adjacent the peripheral boundary. The resonant beam has a resonant frequency such that movement of the diaphragm in response to changes in the force on the diaphragm results in a change to the resonant frequency of the resonant beam. In one embodiment of the invention, the flexible diaphragm or the resonant beam or both are formed from single crystal silicon.

The invention also provides a method of forming the force transducer. The method includes the steps of implanting in the substrate layer a one of an n-type or p-type dopant; doping the substrate to create a first region doped with the other of the n-type or the p-type dopant, and a second region spaced from the first region and being doped with the other of the n-type or the p-type dopant; depositing an epitaxial layer on said surface over said first and second regions; implanting a first sinker through the epitaxial layer and into connection with the first regent; implanting a second sinker through the epitaxial layer and into connection with the second region; anodizing the substrate to form porous silicon of the first and second sinkers and of the first and second regions; oxidizing the porous silicon to form silicon dioxide; and etching the silicon dioxide to form the recess, the flexible diaphragm, and the resonant beam.

It is an advantage of the invention to provide a method of forming a force transducer having a single crystal resonating beam adjacent a single crystal diaphragm.

It is also an advantage to provide a force transducer having a single crystal resonating beam adjacent a single crystal diaphragm.

It is another advantage of the invention to provide a force transducer that can be inexpensively formed by single-sided fabrication in relatively few steps.

It is another advantage of the invention to provide a force transducer of high sensitivity and accuracy wherein the beam is integral to the substrate of the transducer.

Other features and advantages of the invention will become apparent to those skilled in the art upon review of the following detailed description, claims, and drawings.

BRIEF DESCRIPTION OF THE DRAWINGS

FIG. 19 is a view taken along line 19—19 in FIG. 4 before any process steps were performed on the substrate.

FIG. 20 is a view taken along line 20—20 in FIG. 4 after the steps of implanting the N-type layer and doping the P-type buried regions.

FIG. 21 is a view taken along line 21—21 in FIG. 6.

FIG. 22 is a view taken along line 22—22 in FIG. 6.

FIG. 23 is a view taken along line 23—23 in FIG. 6.

FIG. 24 is a view taken along line 24—24 in FIG. 8.

FIG. 25 is a view taken along line 25—25 in FIG. 10.

FIG. 26 is a view taken along line 26—26 in FIG. 12.

FIG. 27 is a view taken along line 27—27 in FIG. 14.

FIG. 28 is a view taken along line 28—28 in FIG. 14.

FIG. 29 is a view taken along line 29—29 in FIG. 16.

FIG. 38 is a dark field mask for use in the step of creating an n-type sinker on the structure forming the transducer of FIG. 30.

FIG. 39 is a dark field mask for use in the step of creating a p-type region in the cover layer of the transducer of FIG. 30.

FIG. 40 is a dark field mask for use in the step of creating metalization contacts on the structure forming the transducer of FIG. 30.

Figure 1:
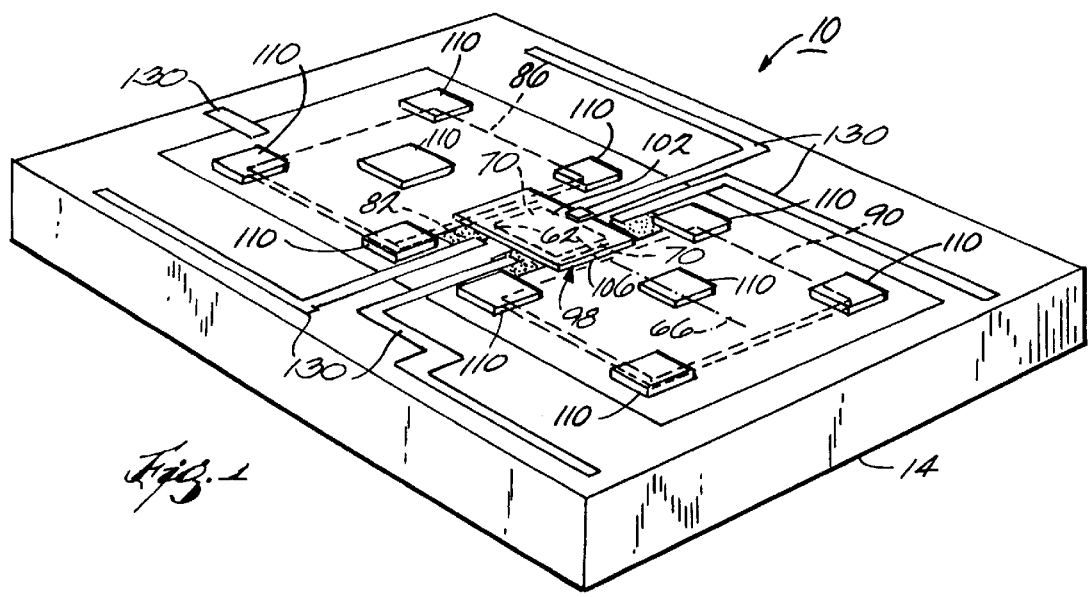
FIG. 1 is an enlarged perspective view of the microelectronic mechanical force transducer.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Illustrated in FIG. 1 of the drawings is a force transducer 10 embodying the invention. Although various types of force transducers such as pressure sensors, strain sensors and displacement sensors may be formed according to the invention, the force transducer 10 is a pressure sensor.

As shown specifically in FIGS. 19–29, the force transducer 10 is formed from a substrate 14 of single crystal silicon which is altered as set forth below in the description of the method of making the transducer 10. In the preferred embodiment, the substrate 14 is a p-type silicon wafer of lightly doped P(100) silicon having p-type boron dopant with a carrier concentration between $10^{15}$ and $10^{16}$ cm$^{-3}$, a <100> cut lattice, 6.0–18.0 ohm-cm resistance. Wafers meeting SEMI standard prime CZ or float zone, for example, are suitable. Examples of other suitable silicon wafers are those having lower concentrations of p-type or n-type dopants than layers to be subsequently added to the wafer, such that the dopant acts as an etch stop at the boundary with the added layers. Referring generally to FIGS. 19–29, the substrate 14 includes a horizontal upper surface 18. Although the substrate 14 can be of any suitable thickness, in the illustrated embodiment, the substrate 14 is about 500 microns thick.

The upper surface 18 defines an elongated cavity or recess 22 (FIGS. 28 and 29) having a pair of spaced sidewall surfaces 26 (only one of which is shown in FIG. 29), a pair of spaced end wall surfaces 34 extending between the sidewall surfaces 26, and a horizontal bottom surface 42 extending between the sidewall surfaces and end wall surfaces. The sidewall surfaces 26, end wall surfaces 34 and bottom surface 42 thus cooperate to define the cavity 22. The upper surface 18 also defines two square cavities or recesses 46 and 50 adjacent respective end wall surfaces 34. More particularly, the cavities 46 and 50 include peripheral boundaries 54 and 58 adjacent the end wall surfaces 34, respectively.

An epitaxial layer 60 is deposited on the upper surface 18. The epitaxial layer 60 includes a center portion forming a plate or beam 62 (best shown in FIGS. 22 and 23) which extends across the cavity 22. In the embodiment illustrated in FIG. 1, the beam 62 has a longitudinal axis 66 and includes opposite end portions 70 engaging the upper surface 18 adjacent the end wall surfaces 34 so that the beam 62 is capable of resonating at a given frequency in response to a stimulus. In other embodiments, the resonant plate or beam 62 may be circular or another shape and include an edge portions. Hereinafter, the term end portions is defined to include any edge portion of the plate or beam 62, notwithstanding the actual shape of the plate or beam 62. Engagement of the beam 62 to the upper surface 18 at the end portions 70 allows strain in the epitaxial layer 60 (or in the substrate 14) in the direction of the longitudinal axis 66 of the beam 62 to change the resonant frequency of the beam 62. In the specific embodiment illustrated, the beam 62 is part of the epitaxial layer 60. In other embodiments (not shown), the beam 62 can be formed partially in the epitaxial layer 60 and in the upper surface 18 of the substrate 14. Also the beam 62 can be of any suitable length, however, in the illustrated embodiment, the length of the beam 62 is about 100 μm. The beam 62 includes an upper surface 72 and a lower surface 74 spaced from the bottom wall 36. The beam 62 has a thickness of about 1.5 microns between the upper and lower surfaces 72 and 74, respectively. The beam 62 also includes a pair of oppositely facing side surfaces 82

(only one of which is shown in FIGS. 1 and 28) extending between the upper and lower surfaces 72 and 74. The side surfaces 82 are generally parallel to the side wall surfaces 26. The beam 62 also has a width defined by the distance between the side surfaces 82, which, in the illustrated embodiment, is about 20 microns.

Figure 6:
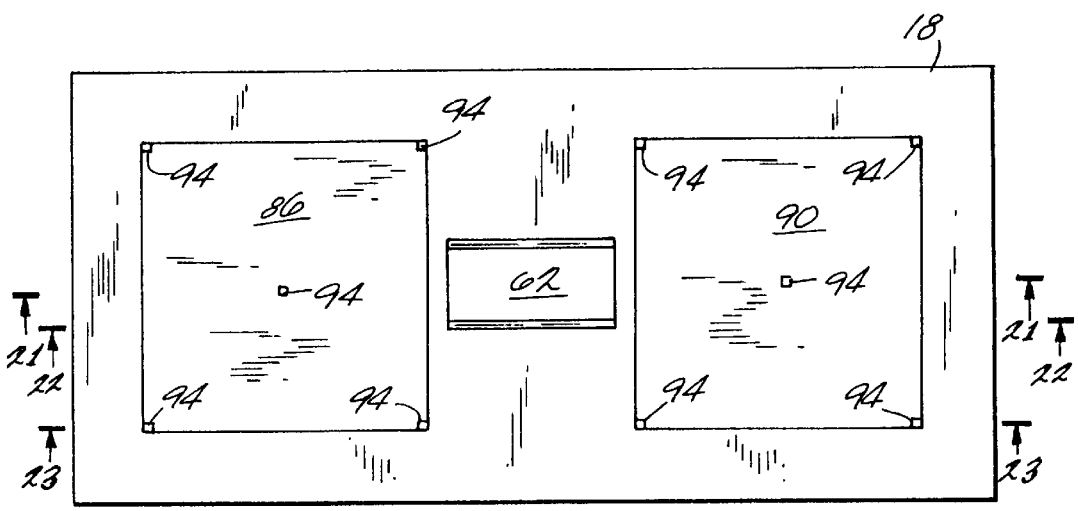
FIG. 6 is a top-down view of the structure after the step of implanting sinkers through the epitaxial layer.

The epitaxial layer 60 includes two diaphragm portions 86 and 90 adjacent the respective end portions 70 of beam 62. The diaphragm portions 86 and 90 cover the square cavities 46 and 50, respectively. The diaphragm portions 86 and 90 each include five sealed apertures 94 (shown in the "unsealed" state in FIG. 6) formed therein. As described in greater detail below, the sealed apertures 94 facilitate fabrication of the transducer 10 and are formed and sealed during fabrication of the transducer 10. The diaphragm portions 86 and 90 are deflectable, either upwardly or downwardly, in response to a change in the force or pressure applied to the diaphragm portions 86 and 90. Movement of the diaphragm portions 86 and 90 changes the strain in the beam 62 and thereby changes the frequency at which the beam 62 resonates.

The transducer 10 also includes a cover layer 98 mounted on the epitaxial layer 60. The cover layer 98 includes a center portion 102 spaced from the upper surface 72 of the beam 62, and a periphery 106 supporting the cover layer 98 on the epitaxial layer 60 so as to completely cover the beam 62 and seal the cavity 22. In other words, the cover layer 98 cooperates with the side walls 26, end walls 34 and bottom wall 42 of the upper surface 18 to enclose the cavity 22 and thus define a closed space about the beam 62 so that the beam 62 can resonate within the cavity 22. Although any suitable material is appropriate, in the illustrated embodiment, the cover layer 98 consists of polysilicon having a thickness of about 2 microns. Although the space between the cover layer 98 and the upper surface 72 of the beam 62 can be of any suitable dimension, in the illustrated embodiment the cover layer 98 is spaced about 1 micron above the upper surface 72 of the beam 62. As described in greater detail below, the cavity 22 is preferably evacuated to minimize mechanical damping of the resonating beam 62.

The transducer 10 also includes covers 110 (numbered in FIGS. 1, 14 and 27–29 only), which cover the apertures 94 in the diaphragm portions 86 and 90 to completely seal the cavities 46 and 50. Although any suitable material is appropriate, in the illustrated embodiment, the covers 110 consist of polysilicon having a thickness of about 2 microns.

The transducer 10 includes means for causing resonant motion of the beam 62. Although any suitable mechanical or electrical means can be employed for causing resonant motion of the beam 62, in the illustrated embodiment, the means for causing resonant motion of the beam 62 includes a pair of electrodes 114 and 118 (best shown in FIG. 29) which cooperate in response to an electrical stimulus to define a capacitive drive. The electrodes 114 and 118 are electrically connected to circuitry (not shown) to control the capacitive drive. It will be apparent to those skilled in the art that the beam 62 is caused to vibrate or resonate by operation of the capacitive drive in a known manner. It is also apparent that various combinations of dopants can be used to form the electrodes 114 and 118.

The transducer 10 includes means for measuring resonating motion of the beam 62. Although any suitable means can be used for measuring resonating motion of the beam 62, in the illustrated embodiment the means for measuring resonating motion of the beam 62 is a piezoresistor 122. The piezoresistor 122 is created by implanting in the beam 62, a dopant, such as boron. The piezoresistor 122 is connected to integrated circuitry (not shown) in manner well known to those of ordinary skill in the art. The resistance of the piezoresistor 122 changes with strain in the beam 62 in accordance with the piezoresistive effect, and thus permits resonance of the beam 62 to be measured in a known manner. It will be appreciated by those skilled in the art that in different embodiments (not shown), other arrangements of passive electronic circuit elements (e.g., a capacitor, etc.) or of active electronic circuit elements (e.g., operational amplifiers, etc.) can be used for measuring the frequency of resonance of the beam 62. Moreover, the single crystal nature of the beam 62 allows the placement of active or passive signal conditioning circuitry (not shown) to be implanted directly on the beam 62.

The transducer 10 includes metal contacts 126 and electrical conductors 130 connected to the metal contacts 126 for providing a means of connecting the electrodes 114 and 118 and piezoresistor 122 to other circuitry (not shown). In the illustrated embodiment, the metal contacts 126 are aluminum, which is deposited on the epitaxial layer 60. In other embodiments (not shown), the electrical contacts may be formed by dopants implanted to define conductive regions.

Figure 2:
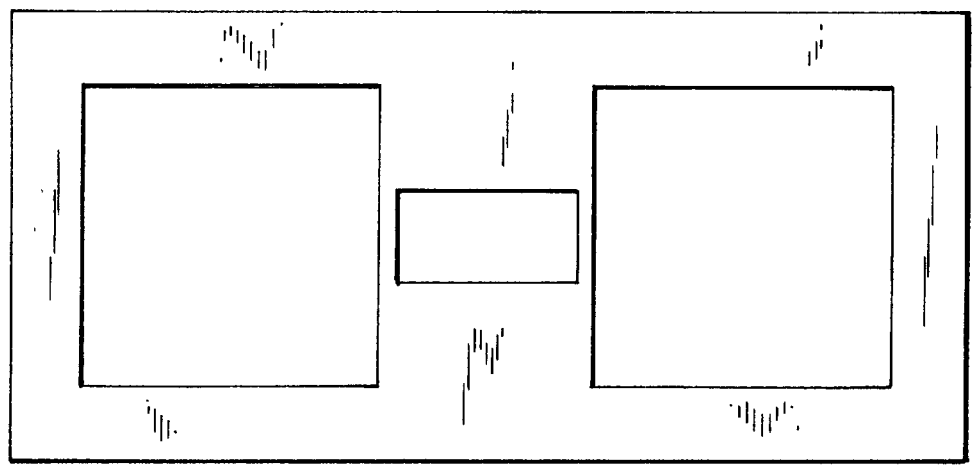
FIG. 2 is a dark field mask for use in the step of implanting an n-type buried layer in the structure forming the transducer.
Figure 3:
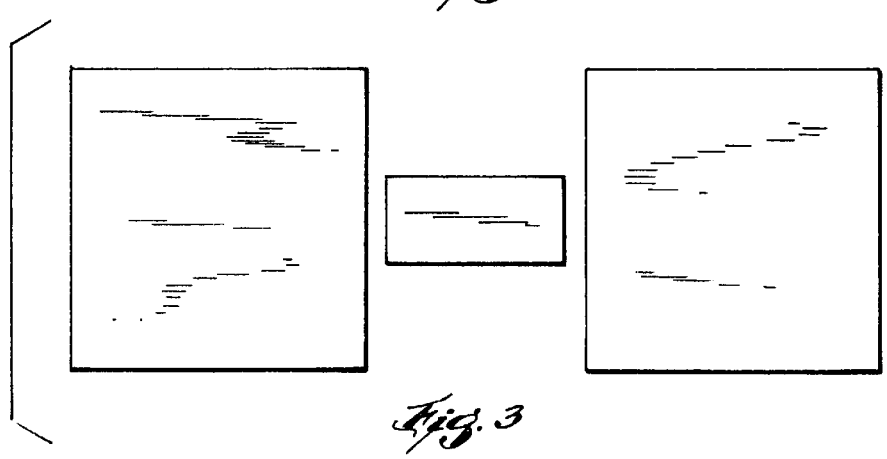
FIG. 3 is a dark field mask for use in the step of doping the structure with a p-type dopant.
Figure 4:
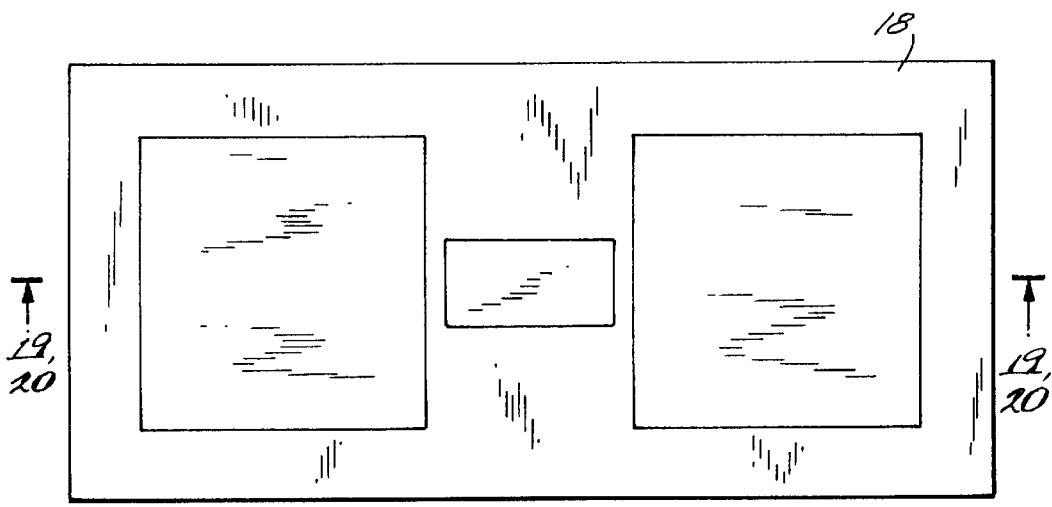
FIG. 4 is a top-down view of the structure after the step of doping.
Figure 5:
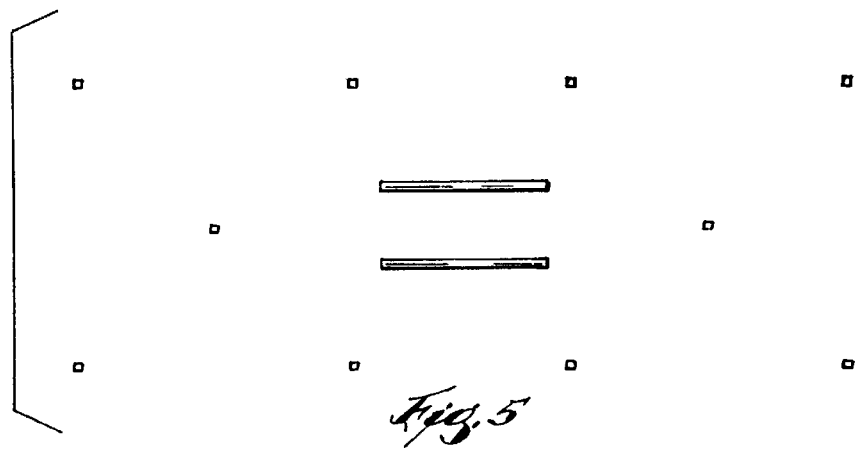
FIG. 5 is a dark field mask for use in the step of implanting sinkers through the epitaxial layer.
Figure 7:
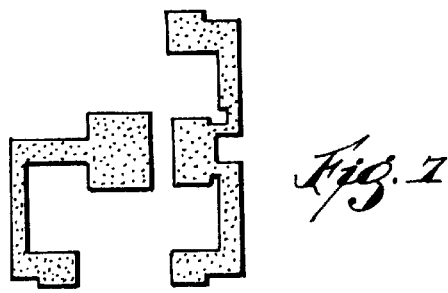
FIG. 7 is a dark field mask for use in the step of implanting the capacitor and piezoresistor.
Figure 8:
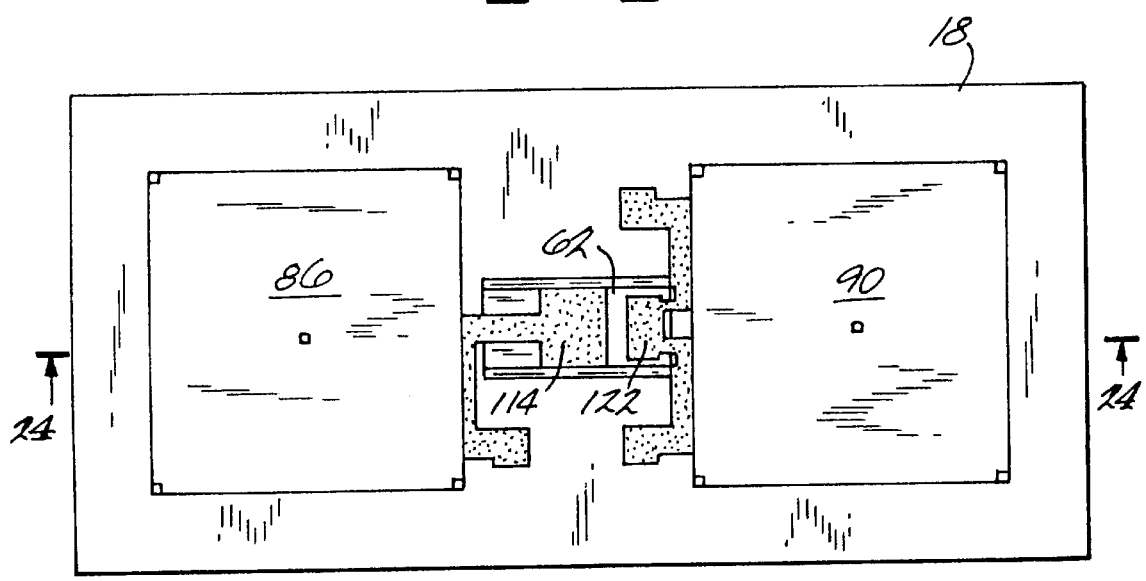
FIG. 8 is a top-down view of the structure after the step of implanting the capacitor and piezoresistor.
Figure 9:
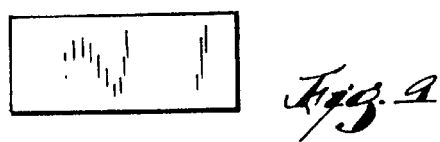
FIG. 9 is a clear field mask for use in the step of creating an oxidized silicon cover over a portion of the structure.
Figure 10:
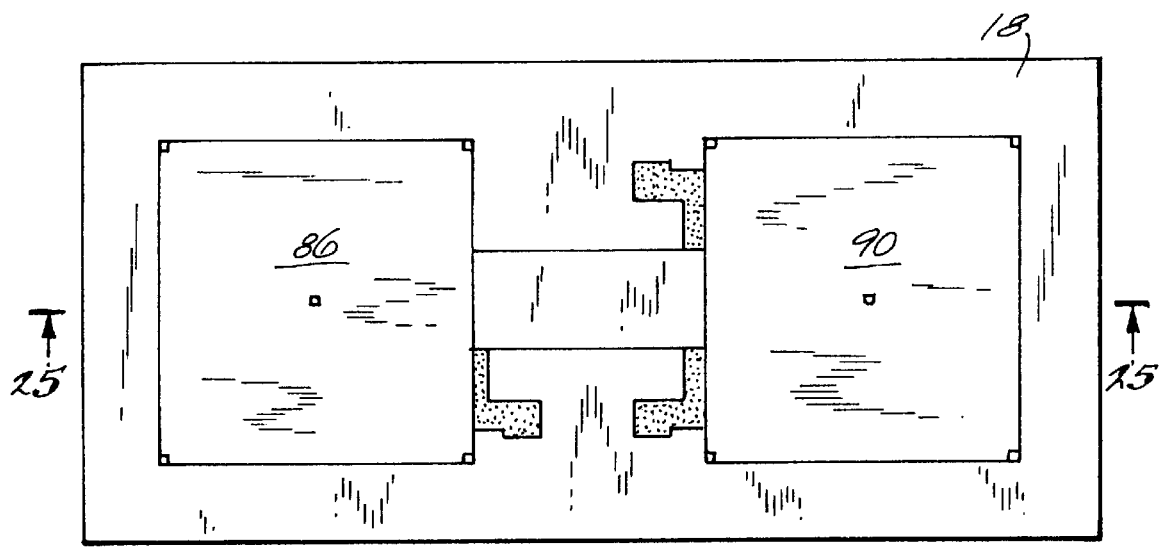
FIG. 10 is a top-down view of the structure after the step of creating an oxidized silicon cover.
Figure 11:
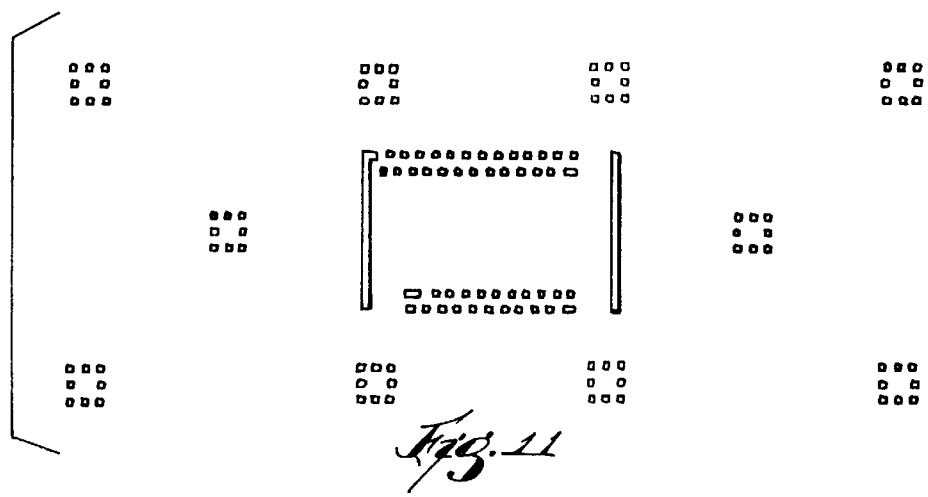
FIG. 11 is a dark field mask for use in the step of creating anchor regions on the structure.
Figure 12:
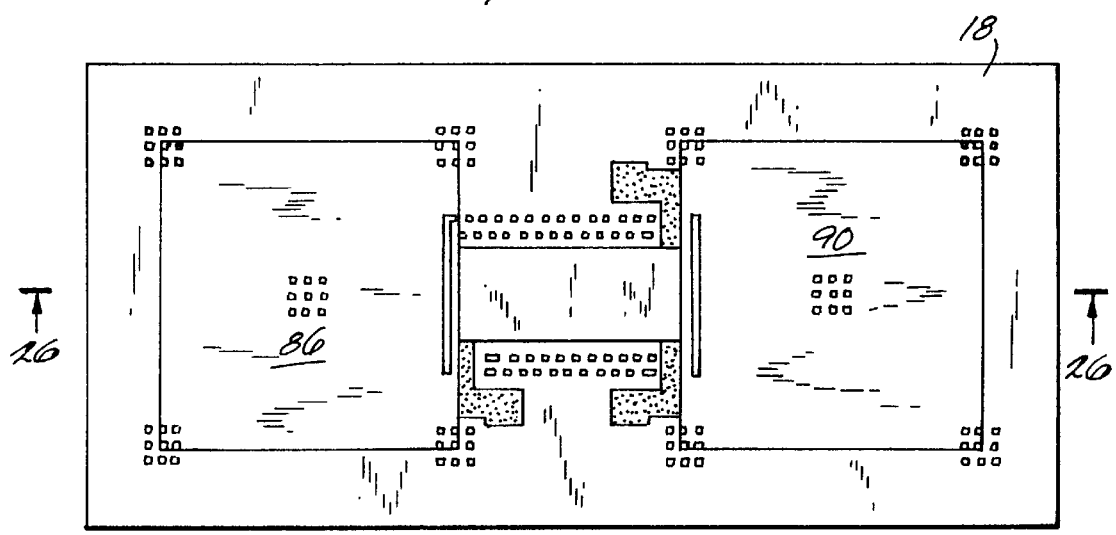
FIG. 12 is a top-down view of the structure after the step of creating anchor regions.
Figure 13:
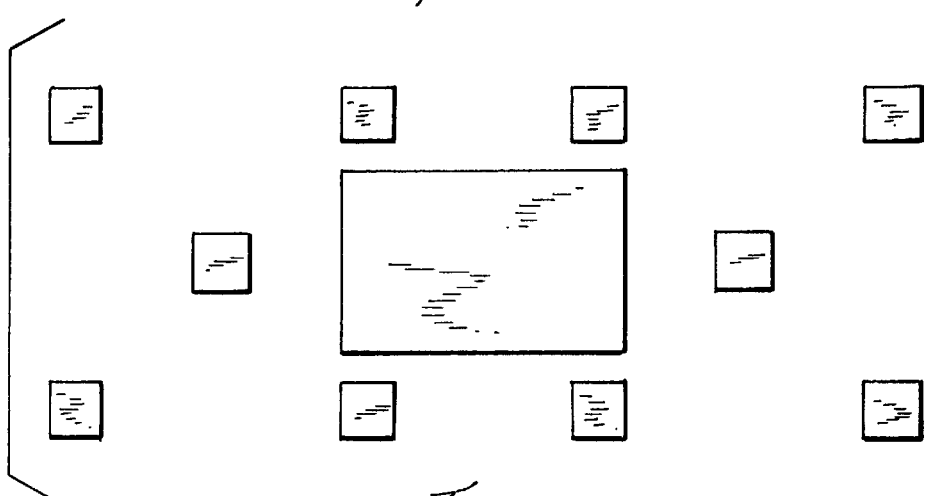
FIG. 13 is a clear field mask for use in the step of creating polysilicon covers at various points on the structure.
Figure 14:
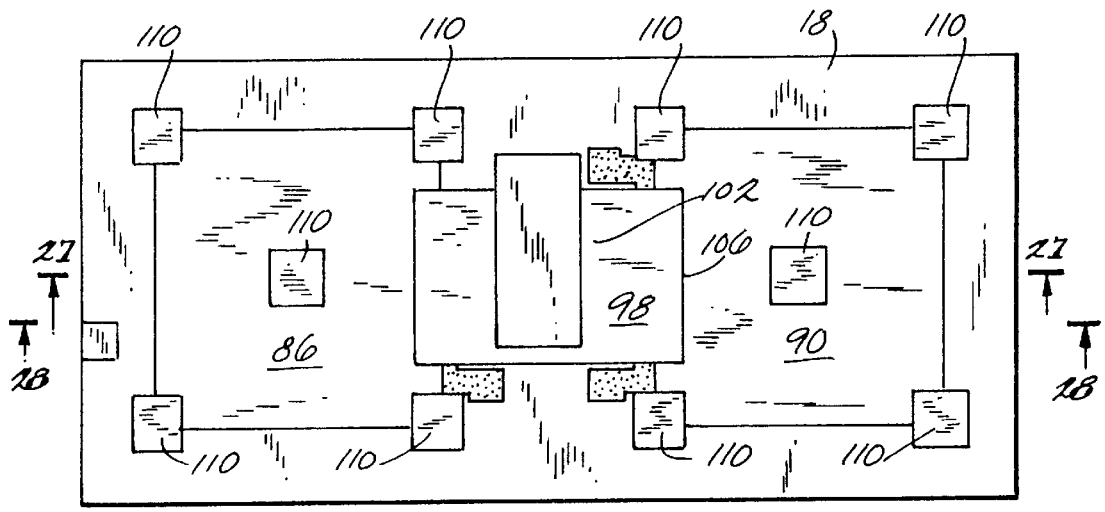
FIG. 14 is a top-down view of the structure after the step of creating polysilicon covers at various points.
Figure 15:
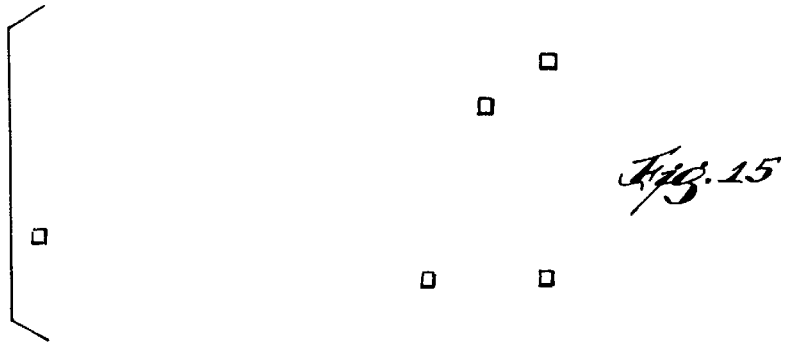
FIG. 15 is a dark field mask for use in the step of creating metalization contacts on the structure.
Figure 16:
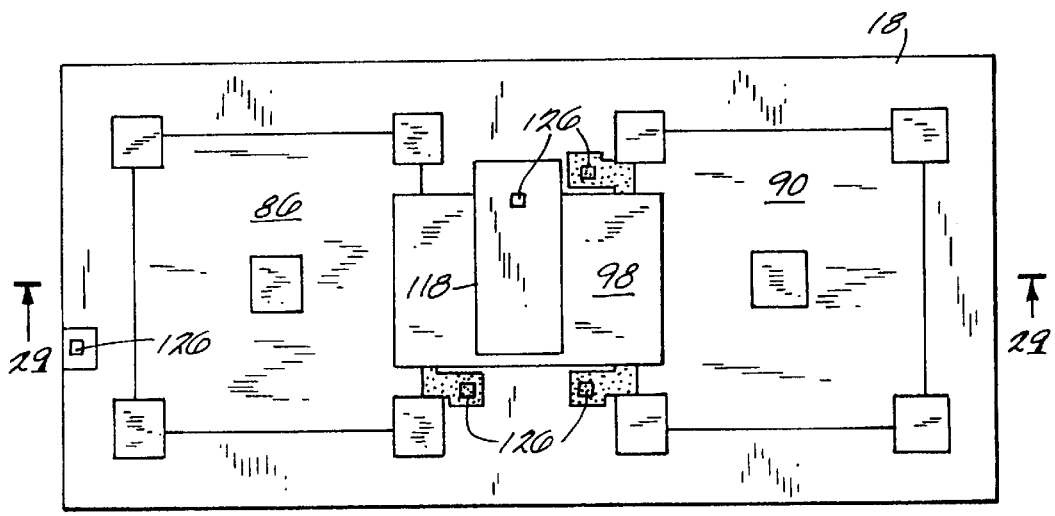
FIG. 16 is a top-down view of the structure after the step of creating metalization contacts.
Figure 14A:
FIG. 14A is a dark field mask for use in the step of creating an n-type sinker on the structure.
Figure 14B:
FIG. 14B is a dark field mask for use in the step of creating a p-type region in the cover layer.
Figure 14C:
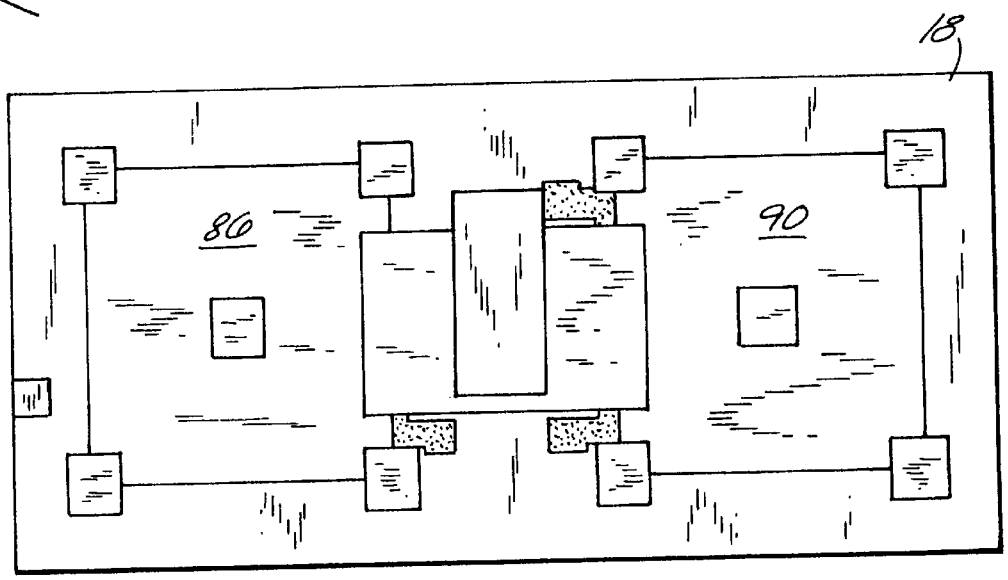
FIG. 14C is a top-down view of the structure after the step of implanting the n-type sinker and the p-type region.
Figure 17:
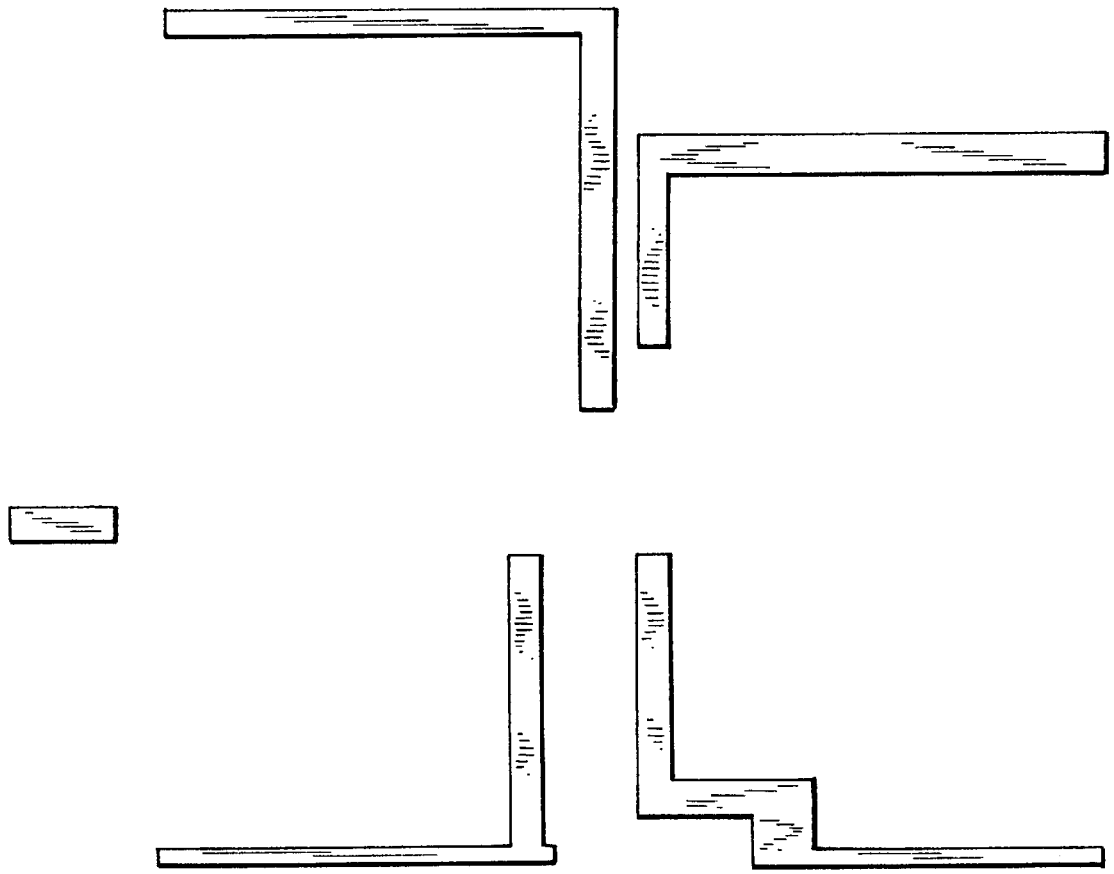
FIG. 17 is a clear field mask for use in the step of creating conductive metal current flow pathways overlaying the metalization contacts.
Figure 18:
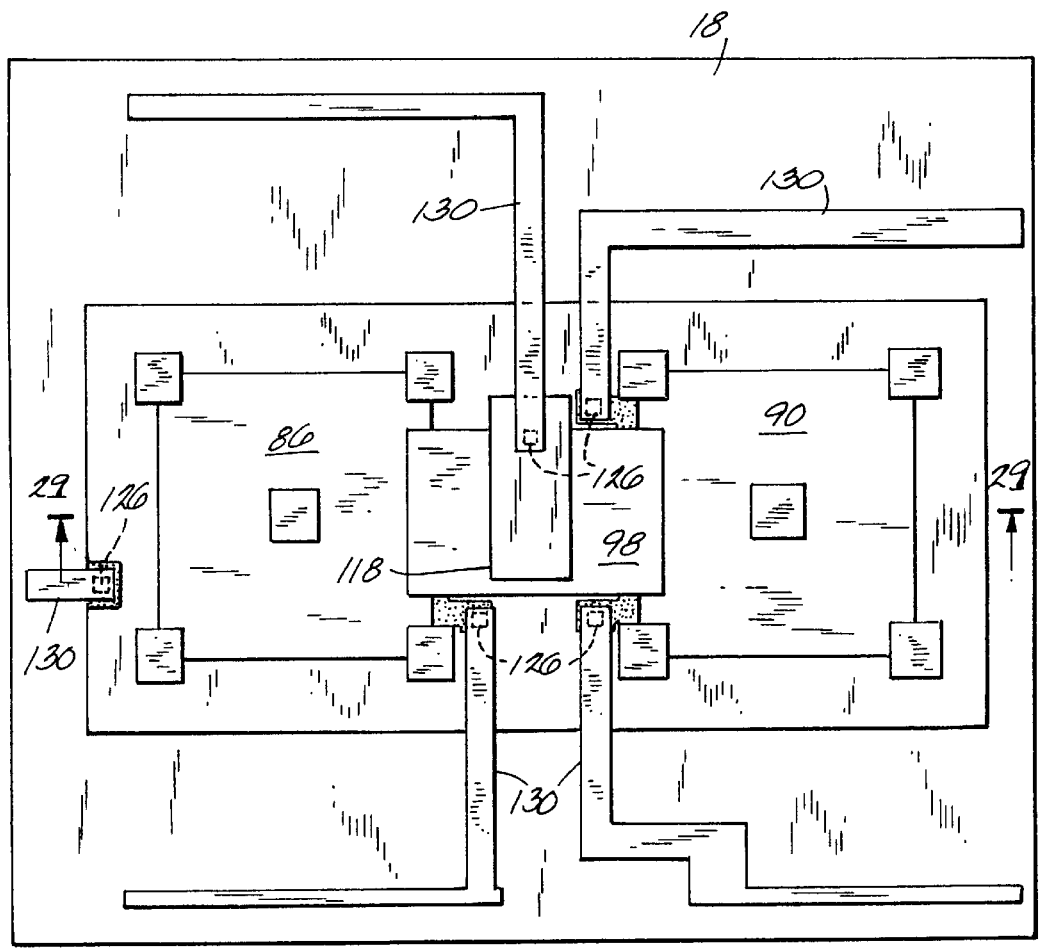
FIG. 18 is a top-down view of the structure after the step of creating the conductive metal pathways.

The transducer 10 having the specific construction described herein is formed by altering the p-type substrate 14 according to the following steps:

1. implanting buried n-type layer 134 in the p-type substrate 14 using the mask shown in FIG. 2 (see FIG. 20);
2. implanting buried p-type layer 138 using the mask shown in FIG. 3 (see FIG. 20);
3. depositing an epitaxial n-type layer 60 on the upper surface 18 of the substrate 14 (see FIG. 21);
4. implanting p-type sinkers 142 through the epitaxial n-type layer 60 and into connection with the p-type layer 138 using the mask shown in FIG. 5 (see FIGS. 21 and 22);
5. forming porous silicon of the p-type layer 138 and the p-type sinkers 142 by anodization;
6. oxidizing the porous silicon to form silicon dioxide in three pre-cavity regions;
7. implanting p-type layers (i.e., electrode 114 and piezoresistor 122) in the epitaxial n-type layer 60 using the mask shown in FIG. 7;
8. depositing a layer of sacrificial material;
9. etching the layer of sacrificial material using mask shown in FIG. 9 to form the sacrificial layer 150 See FIG. 25);
10. growing anchor oxide 152;
11. forming anchor cavities 154 (see FIG. 27) by etching anchor oxide using the mask shown in FIG. 11;
12. depositing the cover layer 98 using the mask shown in FIG. 13;
13. etching the cover layer 98;
14. dissolving the sacrificial layer 150 and the porous silicon dioxide by etching to form the cavities 22, 46 and 50;
15. sealing and evacuating the cavities 22, 46 and 50 (see FIGS. 28 and 29);
16. depositing an insulating layer;
17. implanting an n-type sinker 158 on the epitaxial layer 60 using the mask shown in FIG. 14A;
18. implanting a p-type region (i.e., electrode 118) on the cover layer 98 using the mask shown in FIG. 14B;

19. etching metal contacts 126 through the insulating layer using the mask shown in FIG. 15; and
20. depositing electrical conductors 130 using the mask shown in FIG. 17 to connect the transducer 10 to integrated circuitry (not shown).

It will be appreciated by those skilled in the art that various of the above-mentioned steps may be omitted or altered in different specific embodiments of the invention. For example, the steps regarding the n-type layer, and the p-type layers may differ if different means are employed for causing resonance of the beam 62 or for measuring the resonant frequency of the beam 62.

In the illustrated embodiment, the substrate 14 is prepared for implantation of the buried n-type layer 134 by initially forming a screening layer of $SiO_2$ on the upper surface 18 of the substrate 14. In the illustrated embodiment, the screening layer of $SiO_2$ has a thickness of about 5000+/−500 angstroms. Oxidation to form the $SiO_2$ screening layer is carried out by first "pushing" with about 2.25 liters per minute (l/m) of $N_2$ at a temperature of about 550° C. for a period of about 4 hours, ramping about 2.25 l/m of $O_2$ gas at a rate of about 20° C./minute, oxidizing with about 2.25 l/m of $H_2$ and $O_2$ at about 1000° C., and then ramping with about 8 l/m of $N_2$ at a rate of about 20° C./minute. The term "pushing" as used herein means inserting the wafer into the furnace. As also used herein, the term "ramping" means changing the temperature in the furnace.

The $SiO_2$ screening layer is thereafter etched to achieve a substantially uniform thickness. Etching with a 10:1 buffered oxide etching solution for a period of about 5 minutes is suitable. A suitable etching solution includes about 40% ammonia fluoride, 15% hydrogen fluoride and 45% water. Those skilled in the art will recognize that forming and etching a screening layer of $SiO_2$ before each implant or deposition step may assist in control of the subsequent implantation or deposition step. In other embodiments, any of the screening layers of $SiO_2$ may be omitted.

The buried n-type layer 134 is implanted by applying photoresist to the substrate 14 and then exposing the photoresist with the buried n-type layer mask shown in FIG. 2, removing the mask, and then dosing with a suitable n-type dopant. In the illustrated embodiment, the n-type dopant is phosphorous, which is dosed at a concentration of $5\times10^{13}$ $cm^{-2}$ at 150 KeV. After the photoresist is removed, the buried n-type layer 134 is driven to a final thickness of about 2 to 4 microns by thermal annealing. Thermal annealing can be carried out in any suitable manner, such as by pushing with 2.25 l/m of $N_2$ at 850° C. for a period of about 30 minutes, ramping 2.25 l/m of $O_2$ at a rate of 20° C./minute, oxidizing with 2.25 l/m of $N_2$ at about 1100° C. for a period of about 17 hours, and ramping with 8 l/m of $N_2$ at a rate of 20° C./minute. The thermal annealing conditions specifically described above are provided for illustration, and those skilled in the art will appreciate that different conditions may be used to achieve this result.

The buried p-type layer 138 is implanted over the buried n-type layer 134 by first etching the substrate 14 for 5 minutes to remove the $SiO_2$ formed in the previous thermal annealing step. The buried p-type layer 138 is patterned by applying photoresist to the substrate 14 and exposing the photoresist with the mask shown in FIG. 3. In the illustrated embodiment, the p-type dopant is boron. The boron is dosed at a concentration of $5\times10^{13}$ $cm^2$ at consecutive energy levels of 50, 100 and 150 KeV. After the buried p-type layer 138 is implanted and the photoresist is removed, the buried p-type layer 138 is driven by thermal annealing to a final thickness of about 1 $\mu$m. Thermal annealing can be carried out by pushing with 2.25 l/m of $O_2$ at 850° C. for a period of about 30 minutes, ramping 2.25 l/m of $O_2$ at a rate of 20° C./minute, annealing with 2.25 l/m of $N_2$ at about 1000° C. for a period of about 1 hour and 40 minutes, and ramping with 8 l/m of $N_2$ at a rate of 20° C./minute.

The n-type epitaxial layer 60 is deposited on the entire upper surface 18 of the substrate 14 by epitaxial deposition. In the illustrated embodiment, the substrate 14 the n-type epitaxial layer 60 is deposited by etching the substrate 14 to remove the $SiO_2$ formed in the previous thermal annealing step. The n-type epitaxial layer 60 is deposited in a conventional manner. In the illustrated embodiment, the n-type epitaxial layer 60 has a thickness of about 2+/−0.2 microns and a resistivity of about 0.04+/−0.02 ohms-cm.

The p-type sinkers 142 are implanted in the n-type epitaxial layer 60 and into electrical connection with the p-type layer 138. In the illustrated embodiment, the n-type epitaxial layer 60 is partially oxidized to form a screening layer of $SiO_2$ having a thickness of about 500+/−50 angstroms. The $SiO_2$ can be formed by first "pushing" with about 2.25 liters per minute (l/m) of $H_2$ and $O_2$ at a temperature of about 850° C. for a period of about 10 minutes, and then oxidizing with about 2.25 l/m of $H_2$ and $O_2$ at about 850° C. for a period of about 30 minutes. The p-type sinkers 142 are patterned by applying photoresist and exposing the photoresist with the mask shown in FIG. 5. In the illustrated embodiment, the p-type dopant is boron dosed at a concentration of $4\times10^{14}$ $cm^2$ at an energy level of 175 KeV. After the p-type sinkers 142 are implanted, the photoresist is removed.

The p-type layer 138 and the p-type sinkers 142 are anodized to form a pre-cavity region consisting of porous silicon. Those skilled in the art will appreciate that anodization of the p-type layer 138 and the p-type sinkers 142 is an electrochemical process which can be carried out in any suitable manner. In the illustrated embodiment, anodization is carried out in an electrochemical cell containing from 10 to 50 weight percent hydrofluoric acid. The electrochemical cell is separated into two chambers by the substrate 14 being anodized. Two platinum plates serve as the anodic and cathodic electrodes. The back or lower side portion of the substrate 14 faces the anodic electrode and the upper side portion 16 faces the cathodic electrode. An anodization voltage between about 1 and 7 volts is applied across the electrodes. The anodization process automatically stop's when the low resistance p-type layer 138 and p-type sinkers 142 are converted into porous silicon. The porous silicon thus defines a pre-cavity region in the area previously occupied by the p-type layer 138 and p-type sinkers 142.

The porous silicon in the pre-cavity region is oxidized to form silicon dioxide. The porous silicon is oxidized by first "pushing" with about 2.25 liters per minute (l/m) of $O_2$ at a temperature of about 300° C. for a period of about 1 hour to stabilize the porous silicon, ramping with 2.25 l/m of $O_2$ at 20° C./minute, and oxidizing with 2.25 l/m of $H_2$ and $O_2$ at 850° C. for about 30 minutes to 1 hour, such that the oxide thickness is between about 1000–3000 angstroms. In the illustrated embodiment, the maximum oxidation temperature is maintained at 850° C. in order to avoid inelastic change in the resulting oxide. Upon oxidation, the porous silicon in the pre-cavity region is converted to silicon dioxide, and a layer of silicon dioxide having a thickness of about 1500 angstroms is incidentally formed over the entire upper surface of the n-type epitaxial layer 60.

The p-type layer (i.e., electrode 114 and piezoresistor 122) is implanted in the n-type epitaxial layer 60 is patterned by applying photoresist and exposing the photoresist with the mask shown in FIG. 7. In the illustrated embodiment, the p-type dopant is boron dosed at a concentration of $5 \times 10^{15}$ cm$^{-2}$ at an energy level of 80 KeV. After the p-type layer is implanted and the photoresist is removed, the p-type layer is annealed. In the illustrated embodiment, the p-type layer is annealed by pushing with 2.25 l/m of $N_2$ at 850° C. for a period of 10 minutes and oxidizing with 2.25 l/m of $N_2$ at 850° C. for 30 minutes.

A layer of sacrificial material is deposited over the entire n-type epitaxial layer 60 and pre-cavity regions and then etched to define the sacrificial layer 150. In the illustrated embodiment, the sacrificial material is deposited over the n-type epitaxial layer 60. The sacrificial material is a low temperature oxide glass (LTO glass) having a thickness of about 1 micron. The LTO glass is deposited in a known manner, such as by chemical vapor deposition (CVD). In other embodiments, the sacrificial layer 150 can be silicon nitride or another suitable material. The LTO glass is patterned by applying photoresist and exposing the photoresist with the mask shown in FIG. 9. The LTO glass is etched and the mask is removed to leave the sacrificial layer 150. Etching with a 10:1 buffered oxide etching solution for a period of about 10 minutes is suitable to form the sacrificial layer 150. The photoresist thereafter is removed.

The substrate 14 is prepared for receiving the cover layer 98 by forming anchor cavities 154 in a layer of anchor oxide. In the illustrated embodiment, the anchor cavities 154 are formed in a layer of $SiO_2$. A suitable layer of $SiO_2$ having a thickness of about 1500 angstroms can be formed by oxidizing with 2.25 l/m of $H_2$ and $O_2$ at 850° C. for a period of 30 minutes. The anchor cavities 154 are patterned by applying photoresist and exposing the photoresist using the anchor mask shown in FIG. 11. The wafer is etched to form the anchor cavities 154 in the layer of $SiO_2$. Etching with a 10:1 buffered oxide etching solution for a period of about 1.5 minutes is suitable to form the anchor cavities 154. The photoresist thereafter is removed.

A layer of cover material is deposited over the entire upper side portion of the wafer and then etched to define the cover layer 98. Any suitable cover material can be used. In the illustrated embodiment, the cover material is polysilicon deposited on the wafer by low pressure chemical vapor deposition (LPCVD). The polysilicon is suitably deposited at a temperature of about 580° C. to about 650° C. to a thickness of about 1 to 2 microns. The polysilicon thus deposited is firmly secured to the wafer by polysilicon which fills the anchor cavities 154 and thus defines integral polysilicon anchors. The cover layer 98 is patterned by applying photoresist and exposing the photoresist using the cover mask shown in FIG. 13. The polysilicon is etched to form the cover layer 98. Any suitable polysilicon etching technique can be used. For example, plasma etching with $SF_6$ is suitable to form the cover layer 98. The photoresist thereafter is removed.

The porous silicon dioxide in the pre-cavity regions is removed or dissolved by etching to form the cavities 22, 46 and 50. Any suitable etchant may be employed. In the illustrated embodiment, the etchant is hydrofluoric acid vapor. The use of hydrofluoric acid vapor to etch the cavities 22, 46 and 50 eliminates the need to later dry the cavities 22, 46 and 50. In other embodiments, such as when a liquid etchant is used, it may be necessary to rinse the cavities 22, 46 and 50 with water and to dry the cavities 22, 46 and 50 by a technique such as sublimation of cyclohexane, as is known in the art. The hydrofluoric acid vapor etches away the $SiO_2$ between the anchors, thus forming open etch channels in the layer underneath the cover layer 98, and thereafter etches away the LTO glass forming the sacrificial layer 150 and the silicon dioxide in the pre-cavity regions. The cavities 22, 46 and 50 thus formed are open, in the sense that the etch channels were formed by etching in the spaces between the anchors and underneath the cover layer 98.

The cavities 22, 46 and 50 are sealed and evacuated using any suitable method. Such methods are commonly known in the art and are specifically shown and described in U.S. Pat. Nos. 4,744,863; 4,853,669; 4,897,360; 4,996,082; 5,090,254; and 5,104,693; which are incorporated herein by reference. It is preferred to evacuate the cavity 22 in order to maximize Q of the resonating beam 62 and to evacuate the cavities 22, 46 and 50 so that they are capable of deflecting in response to changes in ambient pressure. In the illustrated embodiment, the wafer is oxidized to form residual $SiO_2$ layers on the inner surfaces defining the cavities 22, 46 and 50 and the etch channels. The residual $SiO_2$ layers can be formed by oxidation by pushing 2.25 l/m of $H_2$ and $O_2$ at 850° C. for 10 minutes and oxidizing with 2.25 l/m of $H_2$ and $O_2$ at 850° C. for 30 minutes. The $SiO_2$ layers formed on the inner surfaces of the etch channels substantially closes the etch channels.

The etch channels are further sealed by depositing sealing polysilicon which fills any openings which may remain between the $SiO_2$ layers. In the illustrated embodiment, the sealing polysilicon is deposited at 580° C. to 650° C. to a final thickness of about 1200+/-120 angstroms. Excess amounts of the deposited sealing polysilicon thereafter are etched away, leaving residual sealing polysilicon which fills and closes any openings in the $SiO_2$ layer. The sealing polysilicon can be etched in any suitable manner. In the illustrated embodiment, the sealing polysilicon is isotropically plasma etched with $SF_6$. The photoresist thereafter is removed. Upon sealing the etch channels, $O_2$ remaining in the cavities 22, 46 and 50 continues to react until substantially all $O_2$ in the cavities 22, 46 and 50 is consumed. The cavities 22, 46 and 50 are thus sealed and evacuated.

The insulating layer is deposited over the cover layer 98 and the n-type epitaxial layer 60 in a suitable manner. Any suitable insulating material can be used. In the illustrated embodiment, the insulating material is silicon nitride. In the illustrated embodiment, the silicon nitride is deposited by low pressure chemical vapor deposition (LPCVD) at 835° C. to a thickness of about 950+/-90 angstroms. The insulating layer insulates the force transducer 10 from undesired electrical contact.

The n-type sinker 158 is implanted through the n-type epitaxial layer 60 and into electrical connection with the n-type layer. The n-type sinker 158 is patterned by applying photoresist and exposing the photoresist with the mask shown in FIG. 14A. In the illustrated embodiment, the n-type dopant is phosphorous dosed at a concentration of $5 \times 10^{15}$ cm$^{-2}$ at an energy level of 80 KeV. After the n-type sinker 158 is implanted and the photoresist is removed, the p-type sinkers and the n-type sinker 158 are driven to final thickness by thermal annealing. Thermal annealing can be carried out in any suitable manner, such as by pushing with 2.25 l/m of $N_2$ at 850° C., ramping with 2.25 l/m of $O_2$ at a rate of 20° C./minute, annealing with 2.25 l/m of $N_2$ at about 1050° C. for a period of about 8.5 hours, and ramping with 8 l/m of $N_2$ at a rate of 20° C./minute to 850° C.

The p-type region (i.e., electrode 118) is implanted in the polysilicon cover layer 98 by applying photoresist and exposing the photoresist with the mask shown in FIG. 14B. While many different combinations and concentrations of dopant are possible, the p-type dopant of the illustrated embodiment is boron dosed at a concentration of between $5 \times 10^{14}$ cm$^{-2}$ and $5 \times 10^{15}$ cm$^{-2}$ at an energy level of 60–160 Kev. After the p-type region is implanted, the photoresist is removed.

The metal contacts 126 are deposited in a suitable manner for connection to integrated circuitry (not shown). In the illustrated embodiment, electrical contact cavities are etched for receiving the electrical contacts. The electrical contact cavities are patterned by applying photoresist and exposing the photoresist using the electrical contact cavity mask shown in FIG. 15. The insulating layer is etched with a 50:1 buffered oxide etching solution for a period of about 2.5 minutes to form the electrical contact cavities 235. The photoresist thereafter is removed. The electrical contacts are then deposited in the electrical contact cavities. In the illustrated embodiment, the electrical contacts are aluminum. The aluminum is deposited to a thickness of about 7500 angstroms and etched using the mask shown in FIG. 17. Thereafter, the aluminum electrical contacts are alloyed into contact with the silicon by alloying at 450° C. with 15% H$_2$ and 85% N$_2$.

In operation of the force transducer 10, the beam 62 is caused to resonate by operation of the capacitive drive. Because the resistance of the piezoresistor 122 changes with each movement of the beam 62, the oscillation of the beam 62 causes oscillation of the value of the resistance of the piezoresistor 122. Force exerted on the diaphragms causes stress or strain in the beam 62 in the direction of the longitudinal axis 66 of the beam 62. This stress/strain changes the frequency at which the beam 62 is resonating. The change in frequency can be detected electronically, using signal conditioning circuitry (not shown), by detecting the changing resistance of the piezoresistor. This change in frequency is indicative of the change in the force applied to the diaphragms.

Figure 30:
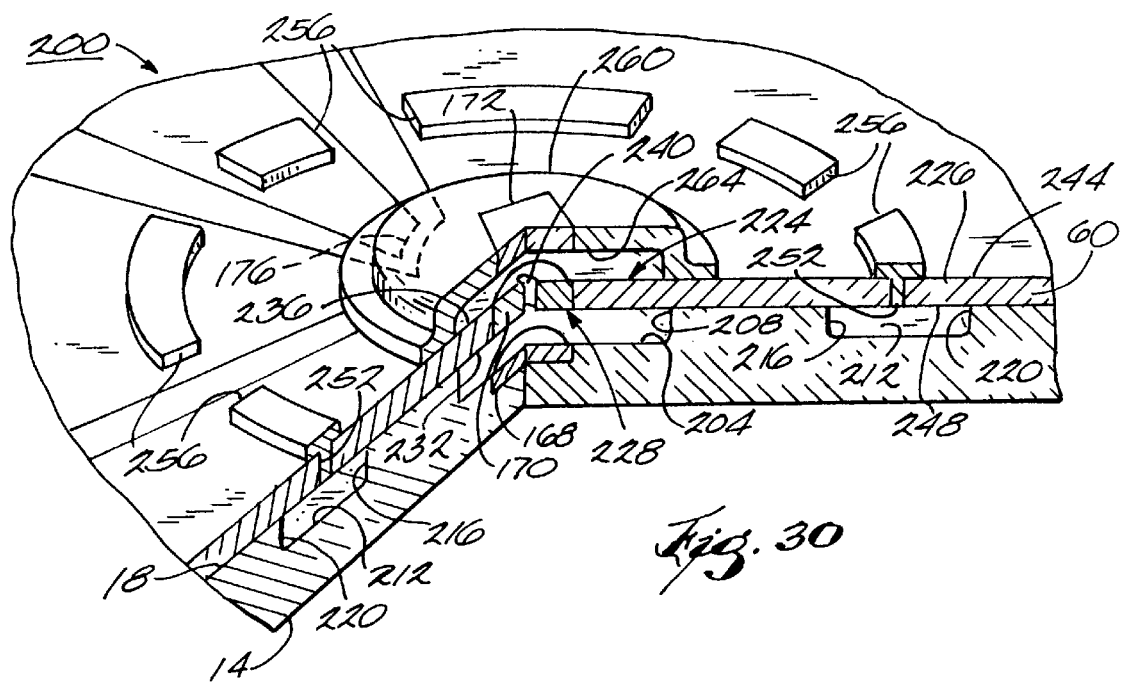
FIG. 30 is an enlarged perspective view of a force transducer that is an another embodiment of the invention.

FIG. 30 illustrates a force transducer 200 that is another embodiment of the invention. Like parts are identified using like reference numerals. As shown in FIG. 30, the transducer 200 includes a substrate 14 having an upper surface 18. The upper surface 18 defines a generally circular cavity or recess 204 having a peripheral boundary 208, and an annular cavity, recess or channel 212 surrounding the recess 204. The annular recess 212 has inner and outer peripheral boundaries 216 and 220, respectively, with the peripheral boundary 208 adjacent the peripheral boundary 216.

The transducer 200 includes an epitaxial layer 60 formed on the upper surface 18 so as to define a resonant plate or beam 224 over the recess 204 and a flexible diaphragm 226 over the recess 212. The plate 224 includes a center portion 228, a lower surface 232 facing the upper surface 18 of the substrate over the region of the recess 204, and an upper surface 236. The plate 224 also includes a passageway 240 extending between the upper surface 236 and the lower surface 232.

The diaphragm 226 includes an upper surface 244 and a lower surface 248 and eight passageways 252 (only two of which are shown in FIG. 30) extending between the upper surface 244 and the lower surface 248. Eight covers 256 (only six of which are shown in FIG. 30) are mounted on the diaphragm 226 to enclose the passageways 252, respectively. Similar to the operation of the transducer 10, movement of the diaphragm 226 in response to a change in the force on the diaphragm 226 changes the stress or strain in the resonant plate 224, which stress or strain in turn changes the frequency at which the plate 224 resonates.

The transducer 200 also includes a cover layer 260 mounted on the epitaxial layer 60. The cover layer 260 completely encloses and seals the plate 224 within an evacuated cavity 264, which cavity 264 includes the recess 204.

Figure 31:
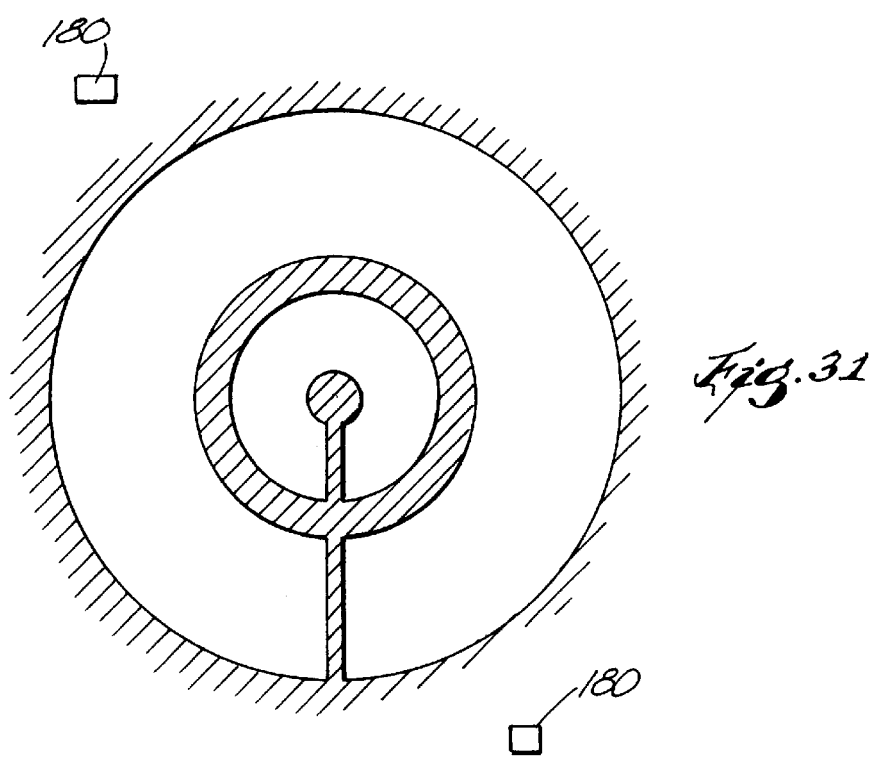
FIG. 31 is a dark field mask for use in the step of implanting an n-type buried layer in the structure forming the transducer of FIG. 30.
Figure 32:
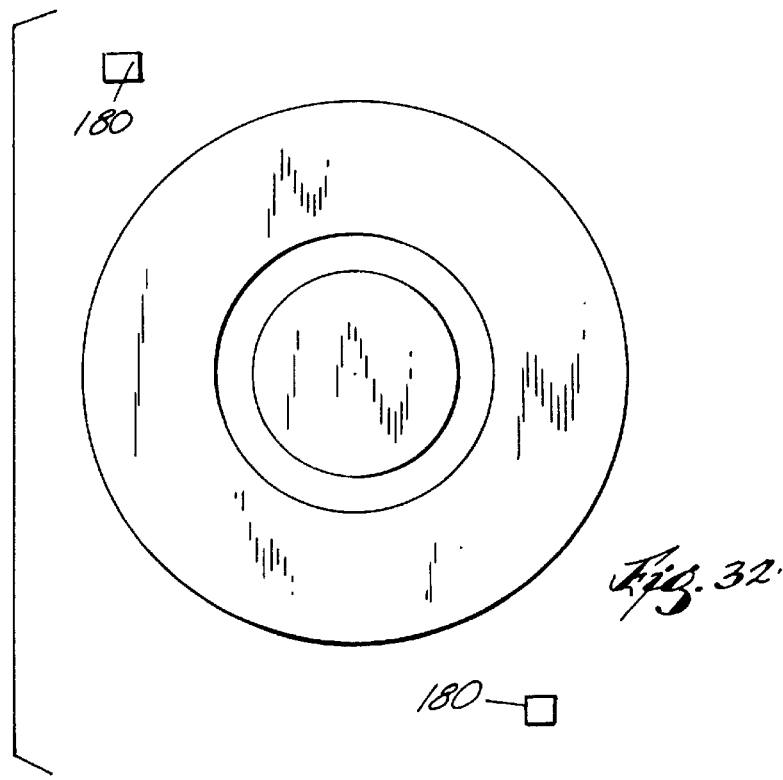
FIG. 32 is a dark field mask for use in the step of doping the structure forming the transducer of FIG. 30 with a p-type dopant.
Figure 33:
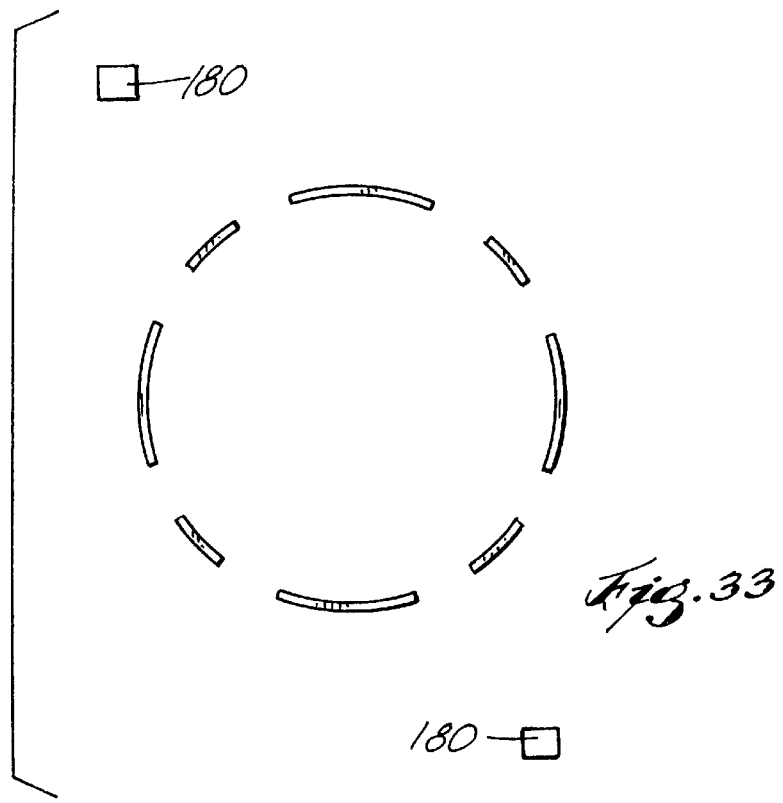
FIG. 33 is a dark field mask for use in the step of implanting p-type sinkers through the epitaxial layer of the structure forming the transducer of FIG. 30.
Figure 34:
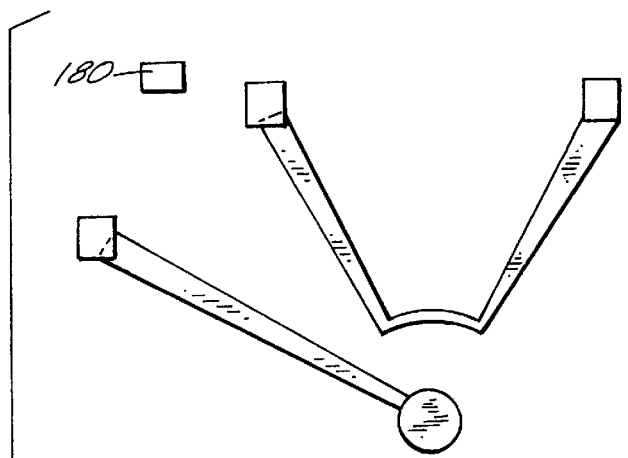
FIG. 34 is a dark field mask for use in the step of implanting the capacitor and piezoresistor in the structure forming the transducer of FIG. 30.
Figure 35:
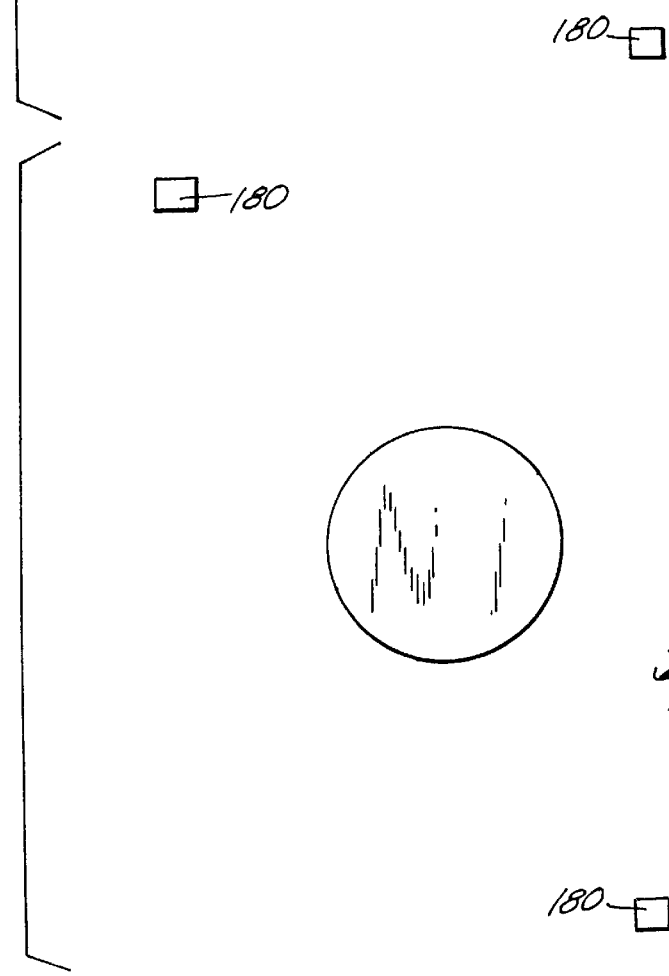
FIG. 35 is a clear field mask for use in the step of creating an oxidized silicon cover over a portion of the structure forming the transducer of FIG. 30.
Figure 36:
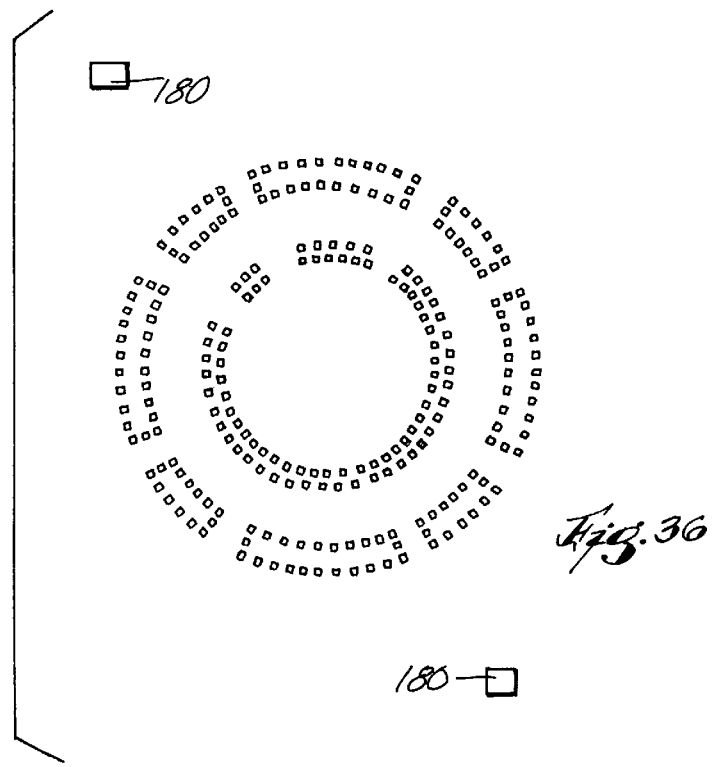
FIG. 36 is a dark field mask for use in the step of creating anchor regions on the structure forming the transducer of FIG. 30.
Figure 37:
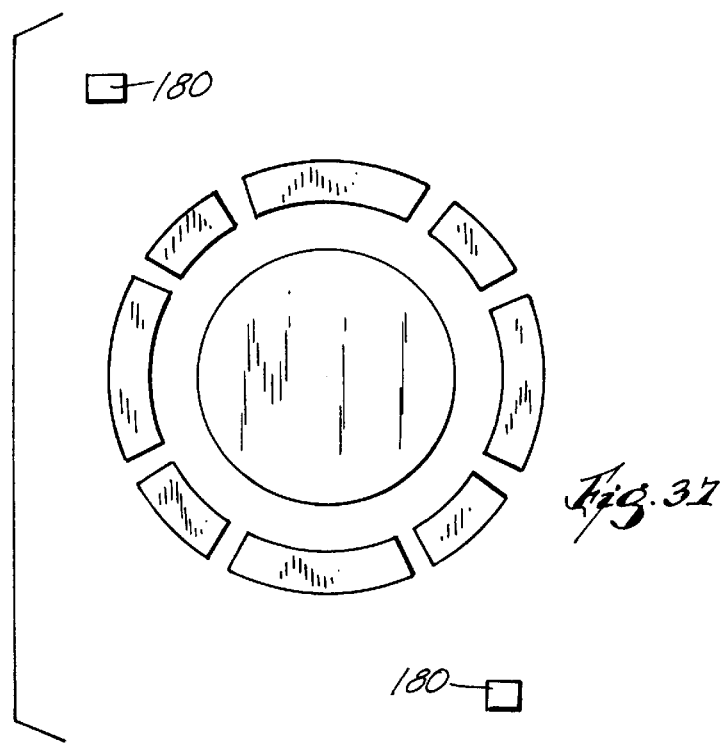
FIG. 37 is a clear field mask for use in the step of creating polysilicon covers at various points on the structure forming the transducer of FIG. 30.
Figure 41:
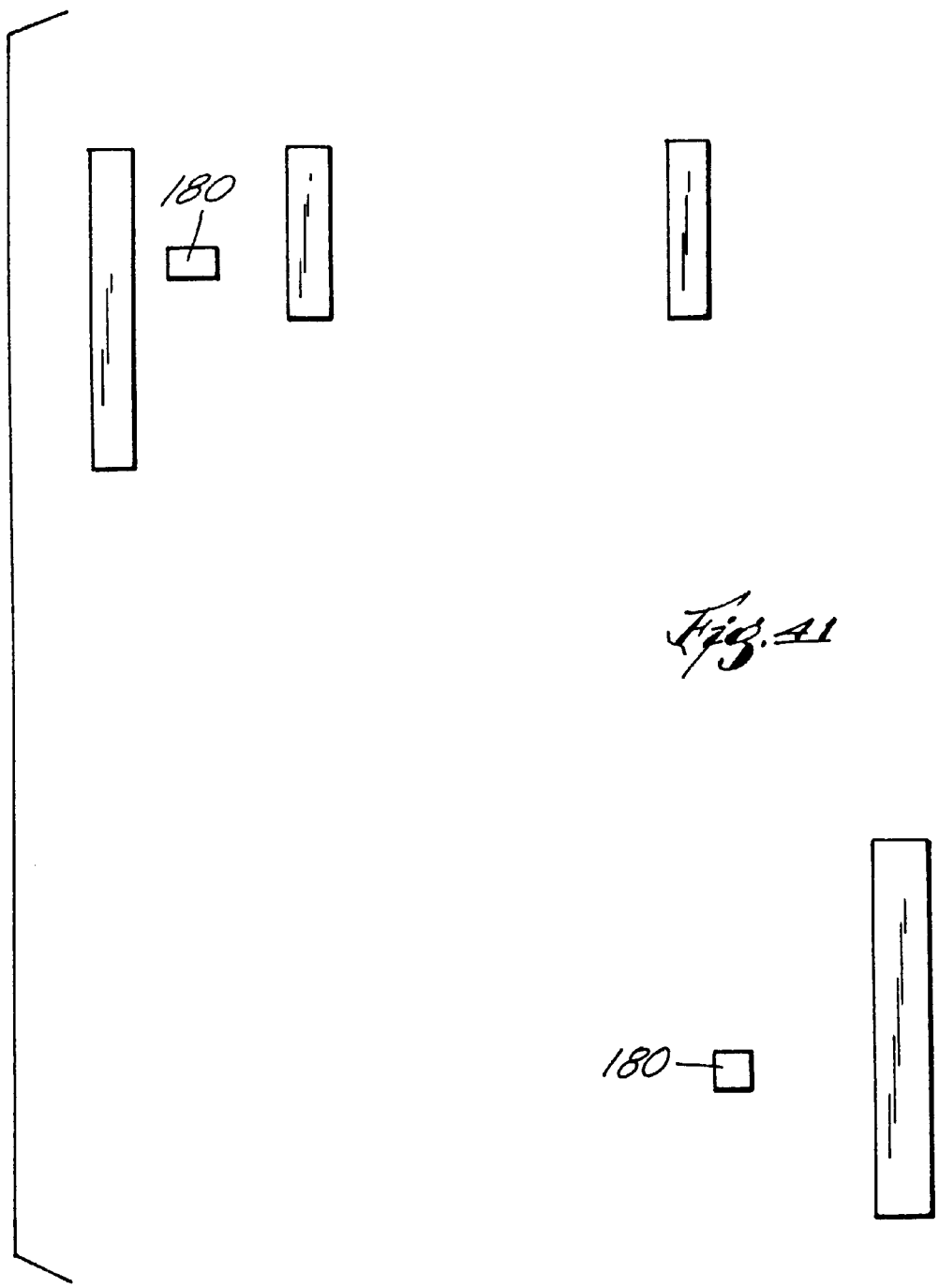
FIG. 41 is a clear field mask for use in the step of creating conductive metal current flow pathways overlaying the metalization contacts.

The transducer 200 also includes means for causing resonant motion of the beam 224. Although any suitable mechanical or electrical means can be employed for causing resonant motion of the beam 224, in the illustrated embodiment, the means for causing resonant motion of the beam includes a pair of electrodes 168 and 172. Electrode 168 is formed using the mask shown in FIG. 31, electrode 170 is formed using the mask shown in FIG. 34, and electrode 172 is formed using the mask shown in FIG. 39. Electrodes 168, 170 and 172 cooperate in response to an electrical stimulus to define a capacitive drive. The electrodes 168, 170 and 172 are electrically connected to circuitry (not shown) to control the capacitive drive. It will be apparent to those skilled in the art that the beam 224 is caused to vibrate or resonate by operation of the capacitive drive in a known manner. In other embodiments, such as that shown in FIG. 1, it is possible to cause resonance of the beam using only two capacitor plates. It is also apparent that various combinations of dopants can be used to form the electrodes 168, 170 and 172.

The transducer 200 includes means for measuring resonating motion of the beam 224. Although any suitable means can be used for measuring resonating motion of the beam 224, in the illustrated embodiment the means for measuring resonating motion of the beam 224 is a piezoresistor 176. The piezoresistor 176 is created by using the mask shown in FIG. 34 to implant in the beam 224, a dopant, such as boron. The piezoresistor 176 is connected to integrated circuitry (not shown) in manner well known to those of ordinary skill in the art. The resistance of the piezoresistor 176 changes with strain in the beam 224 in accordance with the piezoresistive effect, and thus permits resonance of the beam 224 to be measured in a known manner. It will be appreciated by those skilled in the art that in different embodiments (not shown) other arrangements of passive electronic circuit elements (e.g., a capacitor, etc.) or of active electronic circuitry (e.g., operational amplifiers, etc.) can be used for measuring the frequency of resonance of the beam 224. Moreover, the single crystal nature of the beam allows the placement of other active or passive signal conditioning circuitry (not shown) to be implanted directly on the beam 224.

The transducer 200 is formed using the same process steps used to form the transducer 10. However, instead of using the masks shown in FIGS. 2, 3, 5, 7, 9, 11, 13, 14A, 14B, 15, and 17, the transducer 200 is formed using the masks shown in FIGS. 31–41, respectively. FIGS. 31–41 include reference or alignment blocks 180 for use in aligning the masks shown in FIGS. 31–41 with respect to one another.

Various features and advantages of the invention are set forth in the following claims.

We claim:

1. A force transducer comprising:
    a semiconductor substrate including a surface defining a recess, such that said recess has a peripheral boundary;
    a flexible diaphragm connected to said surface along said peripheral boundary to enclose said recess such that said diaphragm moves in response to changes in a force applied to said diaphragm; and
    a resonant beam connected to said surface adjacent said peripheral boundary and said resonant beam having a frequency of resonation such that movement of said diaphragm in response to changes in the force applied to said diaphragm changes said frequency of resonation of said resonant beam.

2. The force transducer as set forth in claim 1 wherein said flexible diaphragm is single crystal silicon.

3. A force transducer as set forth in claim 1 wherein said resonant beam is single crystal silicon.

4. A force transducer as set forth in claim 1 and further comprising a piezoresistor formed on said resonant beam to sense movement of said beam.

5. A force transducer as set forth in claim 1 and further comprising at least a portion of a capacitor formed on said resonant beam.

6. A force transducer as set forth in claim 1 wherein said resonant beam includes opposite ends and wherein one of said ends is adjacent said peripheral boundary of said first flexible diaphragm, and said force transducer further comprises a second recess in said substrate, said second recess having a second peripheral boundary and a second diaphragm connected to said surface along said second peripheral boundary, and wherein said opposite end of said beam is adjacent said second peripheral boundary.

7. A force transducer as set forth in claim 1 and further comprising a cover mounted on said substrate to cover said resonant beam and form a sealed cavity.

8. A force transducer as set forth in claim 1 wherein said sealed cavity is evacuated.

9. A force transducer comprising:
    a semiconductor substrate including a surface defining a recess, such that said recess has a peripheral boundary;
    a flexible diaphragm connected to said surface along said peripheral boundary to enclose said recess such that said diaphragm moves in response to changes in a force applied to said diaphragm;
    a resonant beam connected to said surface adjacent said peripheral boundary and said resonant beam having a frequency of resonation such that movement of said diaphragm in response to changes in the force applied to said diaphragm changes said frequency of resonation of said resonant beam; and
    a cover mounted on said substrate to cover said resonant beam and form a sealed, evacuated cavity around said resonant beam.

10. The force transducer as set forth in claim 9 wherein said flexible diaphragm is single crystal silicon.

11. A force transducer as set forth in claim 9 wherein said resonant beam is single crystal silicon.

12. A force transducer as set forth in claim 9 and further comprising a piezoresistor formed on said resonant beam to sense movement of said beam.

13. A force transducer as set forth in claim 9 and further comprising at least a portion of a capacitor formed on said resonant beam.

14. A force transducer as set forth in claim 9 wherein said resonant beam includes opposite ends and wherein one of said ends is adjacent said peripheral boundary of said first flexible diaphragm, and said force transducer further comprises a second recess in said substrate, said second recess having a second peripheral boundary and a second diaphragm connected to said surface along said second peripheral boundary, and wherein said opposite end of said beam is adjacent said second peripheral boundary.

15. A force transducer comprising:
    a semiconductor substrate including a surface defining spaced first and second recesses, such that said recesses have respective first and second peripheral boundaries;
    a first single crystal silicon flexible diaphragm connected to said surface along said first peripheral boundary to enclose said first recess such that said first diaphragm moves in response to changes in a force applied to said first diaphragm;
    a second single crystal silicon flexible diaphragm connected to said surface along said second peripheral boundary to enclose said second recess such that said second diaphragm moves in response to changes in a force applied to said second diaphragm;
    a single crystal silicon resonant beam connected to said surface, said resonant beam having opposite ends, one of said ends being adjacent said first peripheral boundary and said opposite end being adjacent said second peripheral boundary, and said resonant beam having a frequency of resonation such that movement of said first and second diaphragms in response to changes in the force applied to said diaphragms changes said frequency of resonation of said resonant beam;
    a cover mounted on said substrate to cover said resonant beam and form a sealed, evacuated cavity around said resonant beam;
    a piezoresistor formed on said resonant beam to sense movement of said beam; and
    at least a portion of a capacitor formed on said resonant beam.

16. A force transducer comprising:
    a semiconductor substrate including an upper surface defining spaced first and second recesses; and
    a layer of semiconductor material deposited on said substrate to form a resonant plate over said first recess, said plate having a frequency of resonance, and a diaphragm over said second recess such that movement of said diaphragm changes the frequency of resonance of said resonant plate.

17. The force transducer as set forth in claim 16 wherein said diaphragm is single crystal silicon.

18. A force transducer as set forth in claim 16 wherein said resonant plate is single crystal silicon.

19. A force transducer as set forth in claim 16 and further comprising a piezoresistor formed on said resonant plate to sense movement of said plate.

20. A force transducer as set forth in claim 16 and further comprising at least a portion of a capacitor formed on said resonant plate.

21. A force transducer as set forth in claim 16 wherein said second recess has a peripheral boundary, wherein said resonant plate includes an edge portion and wherein one of said edge portions is adjacent said peripheral boundary of said recess.

22. A force transducer as set forth in claim 16 and further comprising a cover mounted on said substrate to cover said resonant plate and form a sealed cavity.

23. A force transducer as set forth in claim 16 wherein said sealed cavity is evacuated.

24. A force transducer as set forth in claim 16 wherein said first recess is adjacent said second recess.

25. A force transducer as set forth in claim 16 wherein one of said recesses surrounds the other of said recesses.

* * * * *